(12) United States Patent
Nomura et al.

(10) Patent No.: US 9,585,113 B2
(45) Date of Patent: Feb. 28, 2017

(54) METHOD AND DEVICE FOR TIME-SYNCHRONIZATION IN AD HOC NETWORK

(71) Applicant: FUJITSU LIMITED, Kawasaki-shi, Kanagawa (JP)

(72) Inventors: Yayoi Nomura, Fukuoka (JP); Takayuki D Okamasu, Fukuoka (JP); Yasuhiro Kurogi, Fukuoka (JP); Yuichi Inao, Fukuoka (JP); Kenji Yamada, Onojou (JP); Syunsuke Koga, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 14/038,416

(22) Filed: Sep. 26, 2013

(65) Prior Publication Data

US 2014/0029603 A1    Jan. 30, 2014

Related U.S. Application Data

(63) Continuation of application No. PCT/JP2012/057838, filed on Mar. 26, 2012.

(30) Foreign Application Priority Data

Mar. 29, 2011   (JP) .................................. 2011-073467

(51) Int. Cl.
*H04J 3/06*  (2006.01)
*H04W 56/00* (2009.01)
*H04W 84/18* (2009.01)

(52) U.S. Cl.
CPC ..... *H04W 56/0015* (2013.01); *H04W 56/002* (2013.01); *H04W 84/18* (2013.01)

(58) Field of Classification Search
CPC   H04W 56/0015; H04W 56/002; H04W 84/18
(Continued)

(56) References Cited

U.S. PATENT DOCUMENTS 7,522,540 B1 *  4/2009  Maufer ..................... 370/254
2004/0258007 A1 * 12/2004  Nam et al. ................. 370/310
(Continued)

FOREIGN PATENT DOCUMENTS

| JP | 2006-140784 | 6/2006 |
| JP | 2009-260734 | 11/2009 |
| WO | 2011/013165 A1 | 2/2011 |

OTHER PUBLICATIONS

International Search Report mailed May 1, 2012 for corresponding International Application No. PCT/JP2012/057838.
(Continued)

*Primary Examiner* — Faisal Choudhury
(74) *Attorney, Agent, or Firm* — Staas & Halsey LLP

(57) ABSTRACT

A method and a device perform time-synchronization with an ad hoc network configured by a plurality of nodes. The method includes: transmitting a time-synchronization request frame including an address of one of the plurality of nodes which belong to the ad hoc network to one of the plurality of nodes having a function of receiving the time-synchronization request frame and transmitting a time-synchronization reply frame including time-synchronization information; receiving the time-synchronization reply frame including the time-synchronization information from one of the plurality of nodes which receive the time-synchronization request frame; and performing time-synchronization with one of the plurality of nodes using the time-synchronization information included in the time-synchronization reply frame.

8 Claims, 22 Drawing Sheets

(58) Field of Classification Search
USPC .......................................................... 370/350
See application file for complete search history.

(56) References Cited

U.S. PATENT DOCUMENTS

| | | | |
|---|---|---|---|
| 2007/0177574 A1* | 8/2007 | Park et al. ..................... | 370/350 |
| 2007/0238456 A1* | 10/2007 | Robins ................... | G01D 4/002 |
| | | | 455/422.1 |
| 2009/0022136 A1* | 1/2009 | Joshi et al. ................... | 370/348 |
| 2009/0290572 A1* | 11/2009 | Gonia ................... | H04J 3/0641 |
| | | | 370/350 |
| 2010/0014460 A1* | 1/2010 | Shin et al. .................... | 370/328 |
| 2010/0272094 A1* | 10/2010 | Byard ................... | H04W 84/20 |
| | | | 370/350 |
| 2011/0149899 A1* | 6/2011 | Le ......................... | H04W 72/02 |
| | | | 370/329 |
| 2011/0170443 A1* | 7/2011 | Murias et al. ................. | 370/252 |
| 2011/0249688 A1* | 10/2011 | Liu ..................... | H04W 56/002 |
| | | | 370/503 |
| 2012/0106552 A1 | 5/2012 | Iwao et al. | |

OTHER PUBLICATIONS

PCT International Preliminary Report on Patentability issued Oct. 10, 2013 in corresponding International Application No. PCT/JP2012/057838.

* cited by examiner

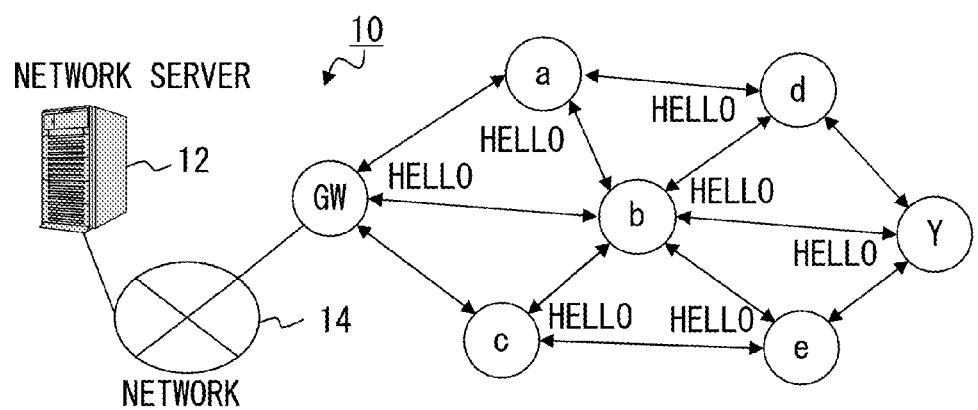
F I G. 1

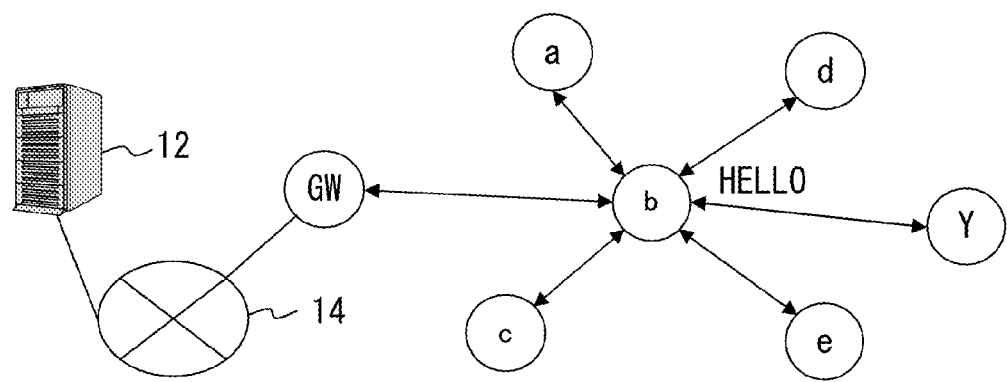
F I G. 3

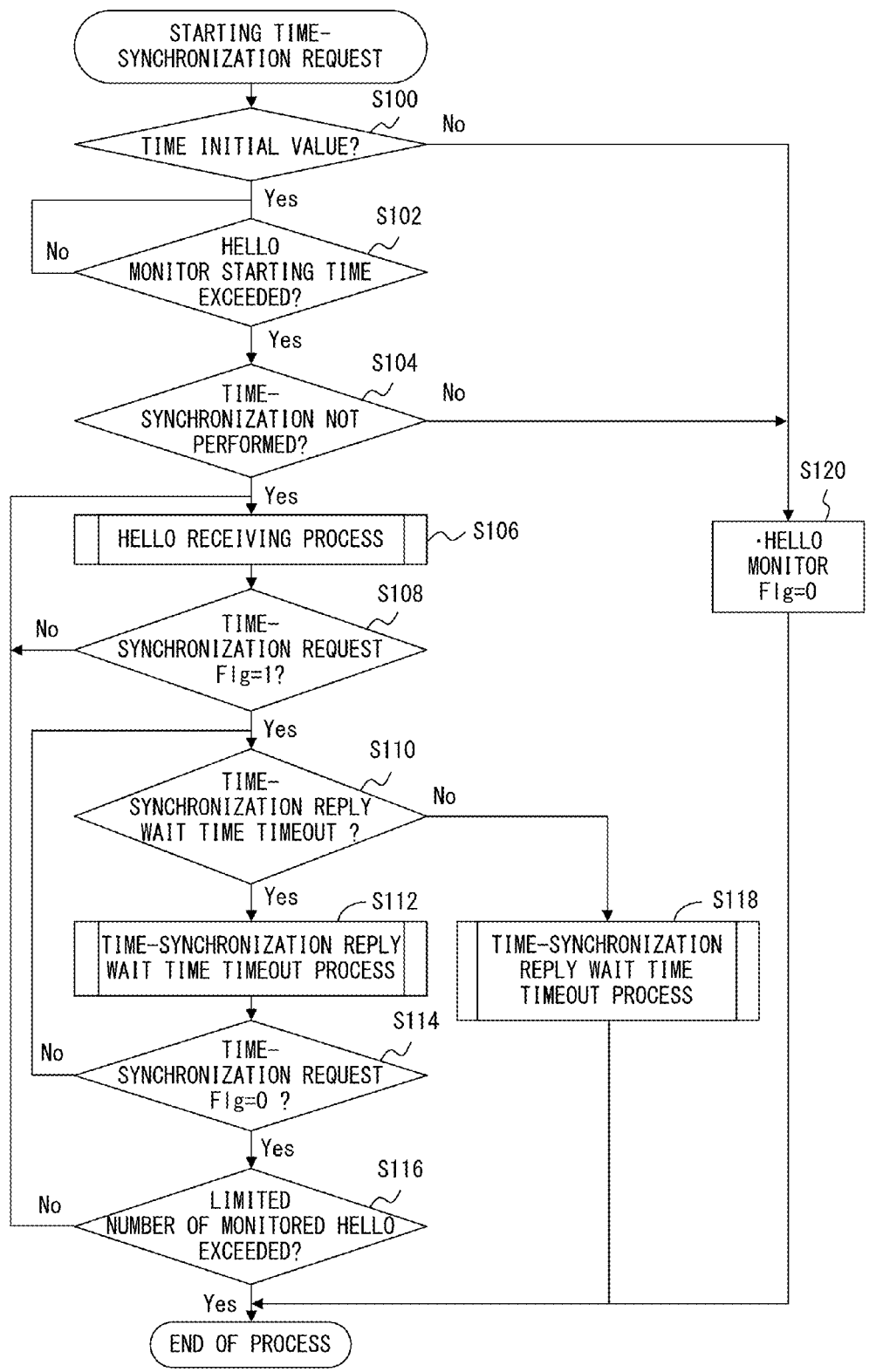
F I G. 6

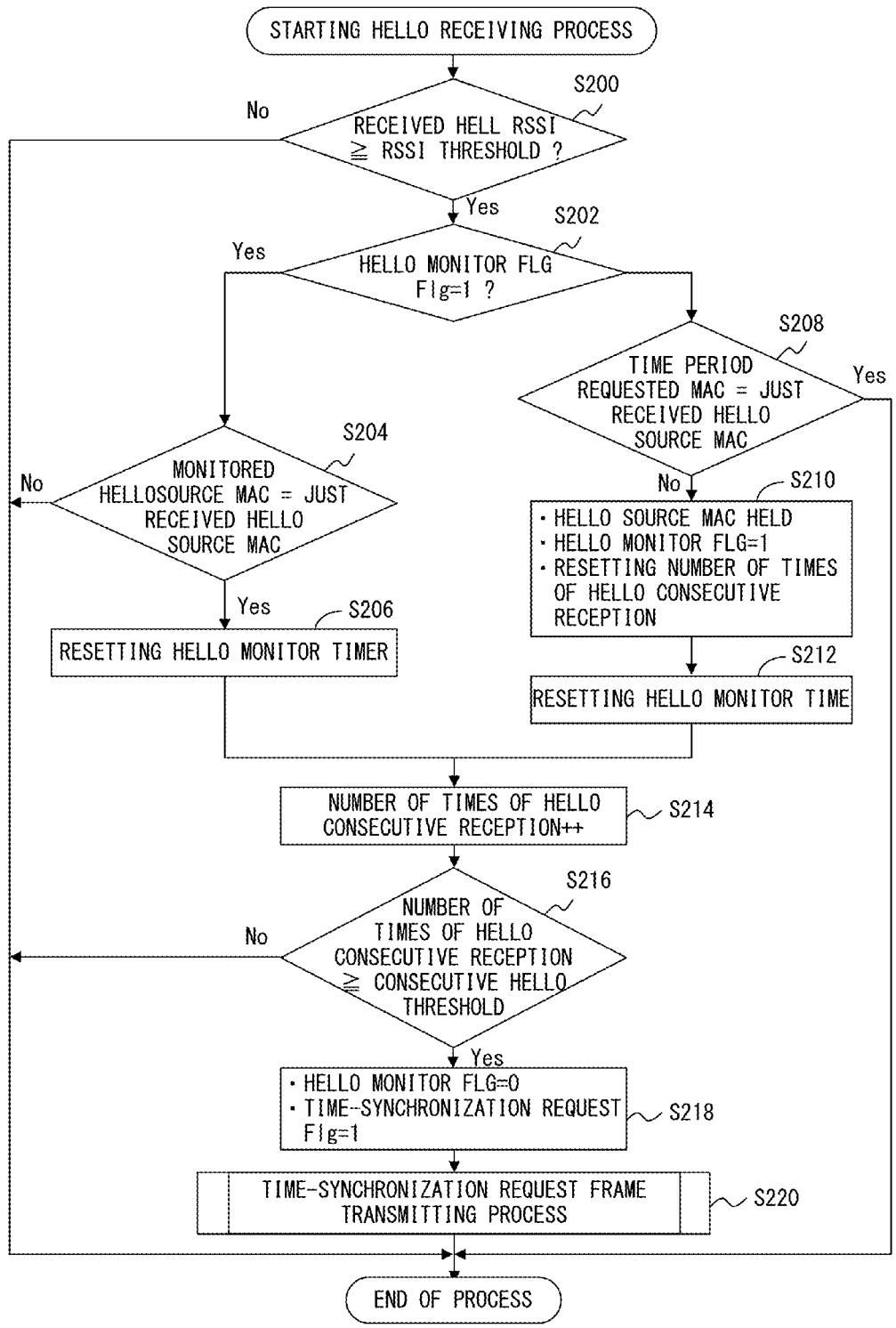
F I G. 7

| AD HOC HEADER | TIME | TIME-SYNCHRONIZATION INFORMATION | SIGNATURE | PADDING |
|---|---|---|---|---|
| | | TIME-SYNCHRONIZATION REQUEST DESTINATION ADDRESS (6 BYTES) | | |

F I G. 1 0

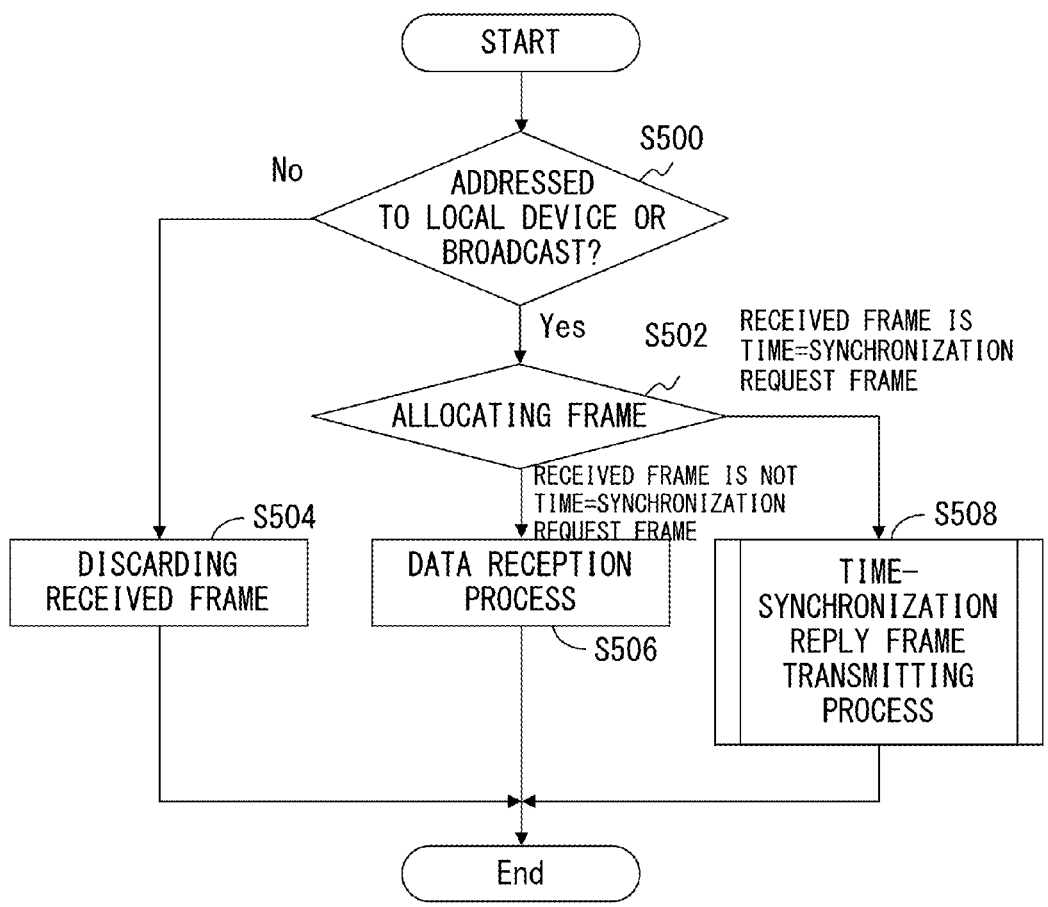
F I G. 1 2

FIG. 15

| AD HOC HEADER | TIME | TIME-SYNCHRONIZATION INFORMATION | | | | SIGNATURE | PADDING |
|---|---|---|---|---|---|---|---|
| | | HOP COUNT (1 BYTE) | RESERVATION (3 BYTES) | NTP COMPLETION TIME (8 BYTES) | TIME-SYNCHRONIZATION FRAME TRANSMISSION TIME (8 BYTES) | | |
| | | | | | DEVICE ACTIVATION ELAPSED TIME (4 BYTES) | | |

METHOD AND DEVICE FOR TIME-SYNCHRONIZATION IN AD HOC NETWORK

CROSS-REFERENCE TO RELATED APPLICATIONS

This application is a continuation application of International Application PCT/JP2012/057838 filed on Mar. 26, 2012 and designated the U.S., which is based upon and claims the benefit of priority of the prior Japanese Patent Application No. 2011-073467 filed on Mar. 29, 2011. The entire contents of these applications are incorporated herein by reference.

FIELD

The embodiments discussed herein are related to a method for time synchronization in an ad hoc network, and a network device using the method.

BACKGROUND

In an ad hoc network system, ad hoc network communication terminals (node devices, or simply referred to as nodes) are autonomously connected to one another over a network to perform communications. The term "autonomously" means no necessity to have a communication terminal or an infrastructure, to be used by a user, dedicated to set a communication route and manage a communication using a server and a router.

As a routing to of an ad hoc network (ad hoc protocol), a reactive AODV (ad hoc on demand distance vector algorithm) examined by the MANET WG of the IETF, and a proactive OLSR (optimized link state routing) are well known.

Also known is a proactive routing protocol for preparing a route for an autonomous data communication by each node prior to a communication request, learning the optimum route at any time, and changing a route (Patent Document 1). In the above-mentioned ad hoc network, each node periodically communicates a message like a hello message including node information such as route information, communication quality information about a link between nodes, etc. between adjacent nodes to know how each node is connected to other nodes. By communicating the above-mentioned message, the optimum route may be learned at any time to change a route.

In an example of a mesh ad hoc network, a node which is connected to a network server (for example, a gateway (GW)) acquires time information from the network server after it is activated, and broadcasts a time synchronous frame to a plurality of nodes subordinate to the upper node, thereby performing time notification. Upon receipt of the time notification, a node sets it as the system time of the local device, and generates a shared key for encryption/decryption based on the time. Therefore, a node whose system time is not set is unable to generate a shared key for decryption although it receives encrypted data from another node. In the above-mentioned ad hoc network, an encryption key which is generated based on the time information is required in communicating data between nodes. Accordingly, each node communicates data when time-synchronization is performed, thereby creating a network.

In a time-synchronized mesh ad hoc network, the transmission period of a time synchronous frame required to acquire time-synchronization between a new node and a node which belongs to an existing network may be, for example, once a day. In this case, a node which is newly entering the network may enter the network only after receiving a time synchronous frame once a day when surrounding nodes periodically transmit the frame, and has to wait for the reception for a day at a maximum after the activation. The transmission period of a time synchronous frame is generally longer than the transmission period of a message including route information such as a hello message and node information such as the communication quality information about a link between nodes.

[Patent Document 1] International Publication Pamphlet No. WO2011/013165

SUMMARY

According to an aspect of the embodiments, a method that performs time-synchronization with an ad hoc network configured by a plurality of nodes is disclosed. The method includes: transmitting a time-synchronization request frame including an address of one of the plurality of nodes which belong to the ad hoc network to one of the plurality of nodes having a function of receiving the time-synchronization request frame and transmitting a time-synchronization reply frame including time-synchronization information; receiving the time-synchronization reply frame including the time-synchronization information from one of the plurality of nodes which receive the time-synchronization request frame; and performing time-synchronization with one of the plurality of nodes using the time-synchronization information included in the time-synchronization reply frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an example of a configuration of a mesh ad hoc network;

FIG. 3 is an example (2) of creating a route by propagating a hello message;

FIG. 6 is a flowchart of the time-synchronization request process of a node device according to an embodiment of the present invention;

FIG. 7 is a flowchart of the hello receiving process of a node device according to an embodiment of the present invention;

FIG. 10 is an example of a format of a time-synchronization request frame;

FIG. 12 is a flowchart of the process of a node which belongs to an existing network;

FIG. 15 is an example of a format of a time synchronous frame/time-synchronization reply frame;

DESCRIPTION OF EMBODIMENTS

In the ad hoc network in which data may be communicated only when time-synchronization is acquired, there has been the problem that a new node may be time-synchronized with a node which belongs to an existing network only after receiving a frame including time-synchronization information for time-synchronization, for example, a time synchronous frame. Therefore, there has been the problem that it is necessary for a new node to take time of a transmission period of the time synchronous frame at a maximum to time-synchronize with a node which belongs to an existing network.

Furthermore, there has been the problem that when data may be communicated in an ad hoc network only after time-synchronization is acquired, a new node may enter a network only after receiving a frame including time-synchronization information for time-synchronization.

An example of the process of configuring a mesh ad hoc network is first described below with reference to FIGS. 1 through 5. In this example, a communication route is created by communicating a hello message. Each node which configures a network acquires time-synchronization by communicating a time synchronous frame with each other. Time is used in decrypting encrypted data. On the other hand, in the network illustrated in FIG. 1, data is not communicated unless time-synchronization is acquired.

After the activation of a new node, a time-synchronization request frame is transmitted from the new node to a node which belongs to a time-synchronized network, and in return the new node is time-synchronized using a time-synchronization reply frame transmitted from the node which belongs to the time-synchronized network to the new node. Therefore, the time taken to the entry of a new node device to an existing network is shortened, thereby shortening network regenerating time.

Figure 16:
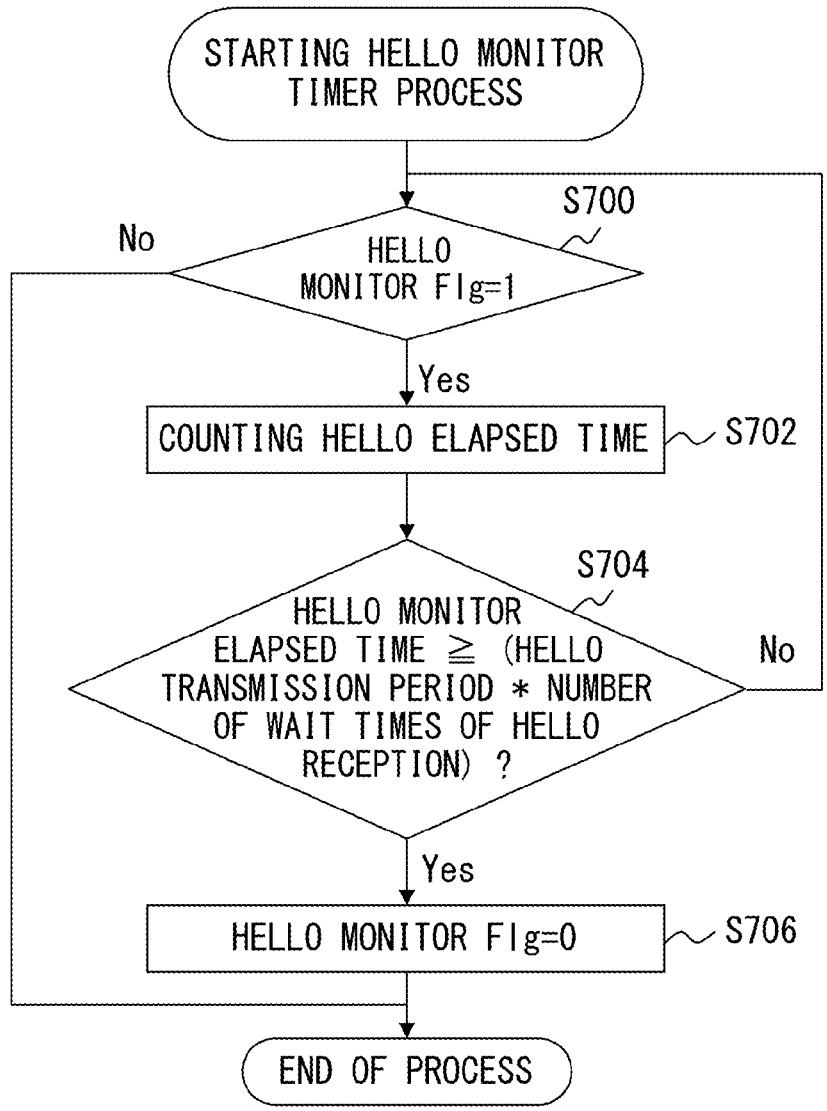
FIG. 16 is a flowchart of the hello monitor timer process of the node device according to an embodiment of the present invention.
Figure 17:
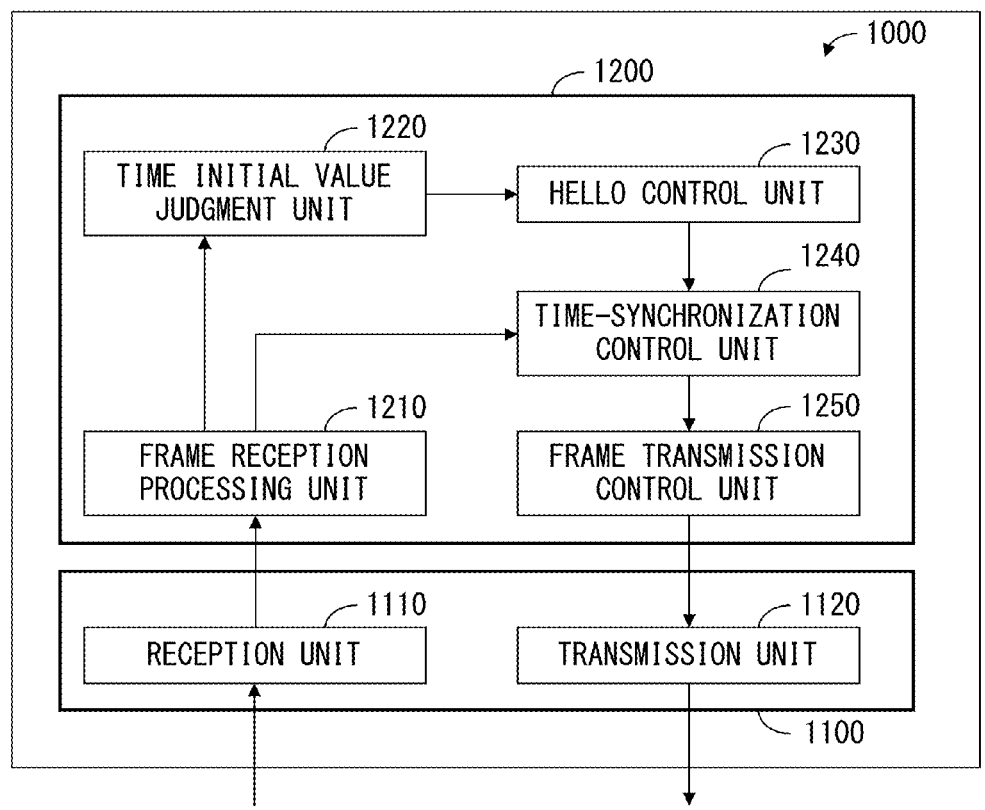
FIG. 17 is a block diagram of the node device according to an embodiment of the present invention.

Next, the method for time synchronization according to the present invention is described with reference to FIGS. 6 through 16. The present method provides a method of allowing a new node to enter an existing network in the network in which data is not communicated unless time-synchronization is acquired. In the method for time synchronization according to the present invention, a node which is not time-synchronized with a network transmits a time-synchronization request frame to a node which belongs to a time-synchronized network before receiving a time synchronous frame including the information for time-synchronization (time-synchronization information). Then, as a reply to the time-synchronization request frame, the node receives a time-synchronization reply frame in the same format as the time synchronous frame. Using the contents of the frame, the node which has transmitted the time-synchronization request frame may be time-synchronized with an existing network. FIG. 17 is a block diagram of a node device which uses the method for time synchronization according to the present invention.

Furthermore, the embodiments 1 through 5 are described below with reference to FIGS. 18 through 22.

(Configuration of Mesh Ad Hoc Network)

FIG. 1 is an example of a mesh ad hoc network. The following embodiment may be applied to a network 10 in FIG. 1. The network 10 includes a network server 12, a network 14 connected to the network server 12, and a gateway GW connected to the network 14. The gateway GW is also a node device of an ad hoc network. Furthermore, the network 10 includes a plurality of node devices a, b, c, d, e, and Y. The node device may also be simply called a node.

The plurality of node devices are interconnected with one another through the links indicated by the arrows illustrated in FIG. 1. Concretely, the gateway GW is connected to the nodes a, b, and c. The node a is connected to the nodes b and d in addition to the gateway GW. The node b is connected to the nodes c, d, e, and Y in addition to the gateway GW and the node a. The node c is connected to the node e in addition to the gateway GW and the node b. The node d is connected to the node Y in addition to the nodes a and b. The node e is connected to the node Y in addition to the nodes b and c. The node Y is connected to the nodes b, d, and e. An example of each node is a sensor. With the configuration, the ad hoc network 10 is also called a sensor network. The connection of nodes through a link may be made by cable or by wireless.

Each node has specific identification (ID). A node ID may be a MAC address. Each node device does not necessarily grasp the node information about a adjacent node or the information about the entire network. Then, each node periodically communicates a message including node information such as route information and communication quality information about the link between nodes such as a hello message etc. to know how the local node is connected to other nodes. The hello message is transmitted from each node at the intervals of, for example, several seconds. By the communication of the message, the communication quality of each route is calculated, and creates a plurality of routes to the final destination and determines the optimum route using the calculation result. That is, the hello message includes node information such as the route information between a node which transmits a message and a adjacent node, the communication quality information about an inter-node link, etc. For example, when any message is transmitted from the gateway GW to the node Y, the route which passes through the nodes a and d may be expressed as {GW, a, d, Y}.

The method f creating a route from the gateway GW to the node Y by propagating the hello message in the network 10 illustrated in FIG. 1 is described below with reference to FIGS. 2 through 4.

Figure 2:
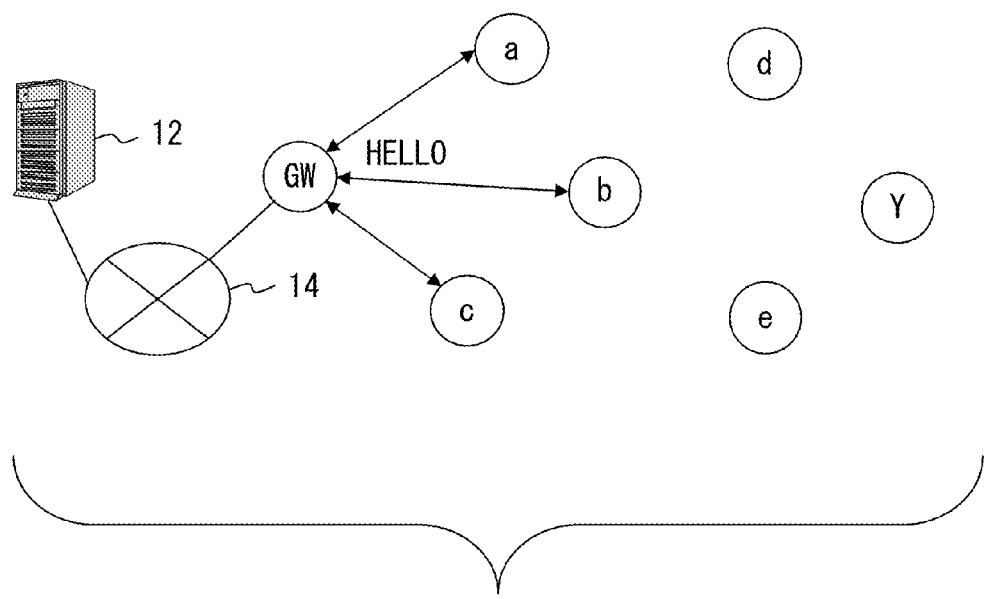
FIG. 2 is an example (1) of creating a route by propagating a hello message.

As illustrated in FIG. 2, the gateway GW broadcasts the hello message with the hello message transmission timing of the gateway GW. In the broadcast, a message is equally transmitted to all nodes connected to the node. Therefore, the hello message transmitted from the gateway GW is received by the nodes a, b, and c.

The nodes a, b, and c which have received the hello message from the gateway GW registers the gateway GW in the route information table (also referred to as a routing table) managed and held in the nodes. Furthermore, they calculate the route quality and the communication quality of the inter-node link using the node information included in the hello message from the gateway GW, that is, the node information held by the gateway GW, and register the calculation result in their own route information table and the link information table (also referred to as a link table). The nodes a, b, and c do not re-broadcast (flood) the hello message received from the gateway GW. The route information table and the link information table provide the information about how the local nodes are connected to other nodes.

Next, for example, in the case of the node b (FIG. 3), the hello message including the node information held by the local node is broadcast with the hello message transmission timing of the node. The hello message of the node b includes the node information about the gateway GW. The node Y receives the hello message from the node b, and registers the node b in the route information table. Since the hello message from the node b includes the information about the connection of the node b to the gateway GW, and the route quality/link quality between the node b and the gateway GW, the node Y may eventually register in the route information table/link information table the route quality/link quality between the node Y and the gateway GW by way of the node b.

Furthermore, like the node b, the nodes d and e also broadcast the hello message with the respective hello message transmission timing. In the node Y, a plurality of routes respectively through the nodes b, d, and e are created. The priorities of the priorities are determined by the route quality/link quality information in each route.

Thus, the route information and the quality information are propagated between the nodes by each node exchanging the hello message, and a plurality of routes to the final destinations are created in the respective nodes.

Additionally, to communicate the hello message between nodes, an encryption key generated according to the time information is required. Therefore, unless time-synchronization is acquired between the nodes which belong to a network, the hello message is not communicated. To acquire the time-synchronization, a time synchronous frame including time-synchronization information may be received. The time synchronous frame is broadcast from, for example, the gateway GW at the frequency of once a day etc. If the time information about the receiving node refers to an initial value, the broadcast is performed again. Otherwise, the broadcast is not performed again, but each node transmits a time synchronous frame in the period set in each node. Generally, the transmission period of the time synchronous frame is longer than the transmission period of the hello message.

Each node calculates (updates) again the communication quality of each route based on the record of the actual data communication and the hello message communicated with the adjacent node relating to the created route, maintains the route and learns the optimum route based on the calculation result, and makes changes at any time.

As described above, since there are normally a plurality of routes in an ad hoc network, data may be transmitted to the final destination by transmitting the data through a route which replaces the route which has become unavailable to the final destination due to an abnormal condition of a node existing in the route. The route may be exchanged according to the information included in the hello message.

As described above, the hello message is transmitted from each node at intervals of, for example, several seconds. Therefore, the optimum route may be updated at the intervals of several seconds, and the network may constantly maintain the appropriate route without a time lag in an actual operation.

Figure 4:
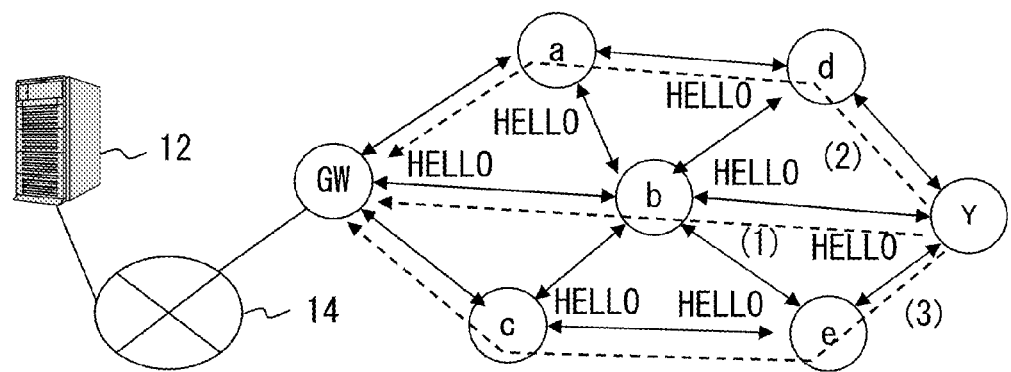
FIG. 4 is an example (3) of creating a route by propagating a hello message.

For example, when the route (1) {Y, b, GW} is used as the optimum route as illustrated in FIG. 4, and although an abnormal condition occurs in the node b, and data is not transferred by the node b, the data may be transmitted to the gateway GW as the final destination by exchanging to the route (2) {Y, d, a, GW} or the route (3) {Y, e, c, GW}.

Furthermore, each node may periodically exchange hello messages with another node to exchange or propagate route information and inter-node link quality information, thereby calculating (updating) again the communication quality of an inter-node link, maintaining a communication route and learning the optimum route, and changing route information at any time.

Consider that anode newly enters the above-mentioned network (new node). To communicate the hello message, it is necessary to prepare an encryption key to be generated based on time information. Therefore, a node which has not been time-synchronized is unable to communicate the hello message or enter the network.

Figure 5:
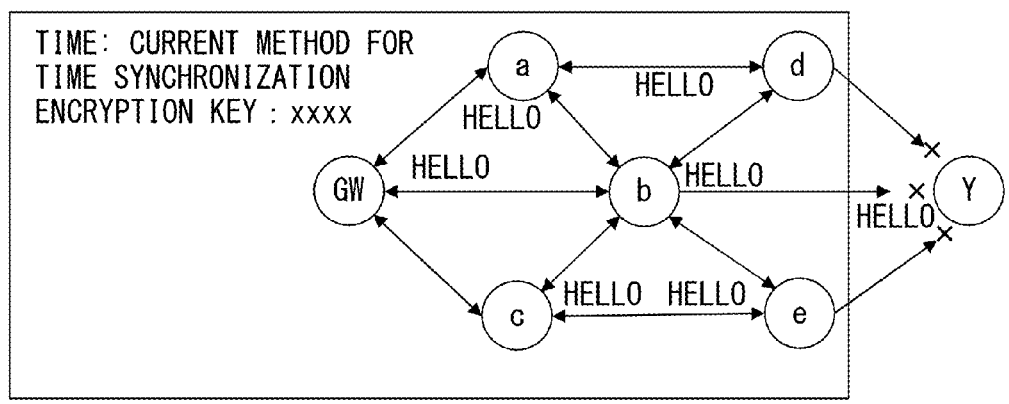
FIG. 5 is an example in which a network is not created using a time initial value.

FIG. 5 is an example in which a network is not created because received data is not decrypted due to a different encryption key from the key of the time-synchronized node group with the node Y which has the initial value (time initial value) as the time. In FIG. 5, the gateway GW and the nodes a, b, c, d, and e share the current value as tie time information. Therefore, the encryption key is xxxx, and each node may decrypt the received data. However, the node Y has the initial value as the time information, and generates an encryption key yyyy which is different from xxxx. Therefore, the node Y is unable to decrypt the data from the nodes b, d, and e.

One of the methods of a new node entering a time-synchronized network is to receive a time synchronous frame. FIG. 15 is an example of the format of a time synchronous frame. The time synchronous frame includes time-synchronization information in addition to an ad hoc header, time, and a signature. The time-synchronization information includes the HOP count (1 byte), the NTP completion time (8 bytes), the time synchronous frame transmission time (8 bytes), and the device activation elapsed time (4 bytes). The HOP count is, for example, the information about the hop count from the gateway GW to the node which is transmitting the time synchronous frame. The NTP completion time refers to the time at which the NTP process is completed between the gateway GW and the network server (NTP server). The time synchronous frame transmission time refers to the time at which the time synchronous frame is transmitted from the node. Since the time-synchronization information includes the time synchronous frame transmission time, the network time may be known. Therefore, the node which has received the time synchronous frame may know the time shared with the node which belongs to a network, and may be time-synchronized. The time synchronous frame is autonomously transmitted in each transmission period by each node which has received the time synchronous frame from the gateway GW, and is time-synchronized.

If there is only one adjacent node which enters an existing network in the time-synchronized ad hoc network configured by the gateway GW, the nodes a, b, c, d, and the transmission period of the time synchronous frame is once a day, then a newly added node is not to enter the network until it receives the time synchronous frame which is periodically transmitted once a day by peripheral nodes with the possibility that it has to wait for one day at a maximum after the activation, and as a result it may take a long time to enter the network.

Then, as described below, by using the method for time synchronization according to the present invention, a new node not time-synchronized with the existing network may be time-synchronized with the existing network. Furthermore, the new node may early enter the existing network.

(Entire Glow of the Method for Time Synchronization)

The method for time synchronization according to the present invention is described below with reference to FIGS. 6 through 16, In the method for time synchronization according to the present invention, a node not time-synchronized with a network transmits a time-synchronization request frame to a node which belongs to a time-synchronized network before receiving a time synchronous frame including the information for time-synchronization (time-synchronization information). Then, it receives a time-synchronization reply frame in the same format as the time synchronous frame as a reply to the time-synchronization request frame.

<Time-Synchronization Request Process>

Described first is the process of transmitting a time-synchronization request frame to a node which belongs to a network with which a new node has already been time-synchronized. Described below is the process after the activation of a new node device. The new node is connected to the existing network, and may receive a hello message and a time synchronous frame from the node which belongs to the existing network. As described above, in the node not time-synchronized with a network, for example, data included in a hello message is not decrypted or read. The hello message includes an ad hoc header, and the ad hoc header includes a local source address. In addition, the ad hoc header is transmitted without encryption. Therefore, a new node which monitors the hello message may be informed of the acquired of the node which has transmitted the hello message from the received hello message header. Then, according to the information about the address, the time-synchronization request frame may be transmitted to the node which has transmitted the hello message. The time synchronous frame includes the information for acquisition of time-synchronization, that is, time-synchronization information. The node which has received the time synchronous frame may set the time of the local node according to the time-synchronization information.

FIG. 6 is a flowchart of the time-synchronization request process of the node device according to an embodiment of the present invention. The process in FIG. 6 is performed by a new node.

When a new node device is activated, a time-synchronization process is started in the new node device with an existing network. When the time-synchronization process is started, the hello monitor timer process illustrated in FIG. 16 is also started. Furthermore, the time count is started by a clock or a timer. The elapsed time from the start of the time count is also referred to as hello monitor elapsed time.

In addition, a hello monitor Flg indicating whether or not a hello message periodically transmitted from a node is to be monitored and a time-synchronization request Flg indicating whether or not the time-synchronization request frame transmitting process is to be performed are reset to "0".

A new node not time-synchronized with an existing network device starts monitoring the hello message which is periodically transmitted by a node after the activation of the device. If the hello message is received from a node, the new node sets the hello monitor Flg indicating whether or not the hello message periodically transmitted from the node to "1". That is, the new node is configured to monitor the hello message periodically transmitted by a node while the hello monitor Flg assigned to the node ID of the node indicates "1". An example of the node ID is a MAC address. When the hello message is not periodically received from a node, the monitor of the hello message transmitted from the node on a specified condition is stopped, and monitoring the hello message from another node may be started. An example of a specified condition includes the signal intensity of the hello message smaller than a specified value and no reception of the hello message for a specified number of times within a specified time period.

In the present embodiment, the source of the received hello message is first recognized as a monitor target, and the number of times the hello message received from the node to be monitored for the hello message is checked. When the number of times of the reception of the hello message from the node to be monitored for the hello message is equal to or exceeds a specified value, the time-synchronization request frame is transmitted to the node to be monitored after the passage of time-synchronization request wait time. The time-synchronization request wait time is a specified time period and, for example, 30 seconds, 45 seconds, 60 seconds, etc. are exemplified. Furthermore, the number of times of the reception of the hello message from a node to be monitored for the hello message may be the number of times of consecutive reception. Furthermore, the time-synchronization request frame may be transmitted to a node to be monitored only after the hello message is received for or exceeding the specified number of times from a node to be monitored within a specified time period.

The node which belongs to an existing network and has received a time-synchronization request frame generates a time-synchronization reply frame including time information, and immediately transmits it to the source of the time-synchronization request frame (a broadcast may be performed). The time-synchronization request frame may be broadcast. A node which has received the time synchronous frame and has not been time-synchronized performs time-synchronization based on the time information set in the time-synchronization reply frame, and enters an existing network. The format of the time-synchronization reply frame may be identical to the format of the time synchronous frame. In the present embodiment, the identical format is used for both frames as illustrated in FIG. 15.

In S100 in FIG. 6, it is judged whether or not the time of the new node is an initial value. The judgment in S100 is made when the new node device is activated. If the judgment is YES, control is passed to S102. If the judgment is NO, control is passed to S120.

In S102, it is judged whether or not the hello monitor starting time has been exceeded. The hello monitor starting time is the time elapsed by specified time period from the time at which the new node has been activated. Generally, the node device indicates a time lag until it enters a stationary operation after it is turned on. Therefore, it is preferable to repeat the process in S102 until the hello monitor starting time is exceeded. When the hello monitor starting time is exceeded, control is passed to S104.

In S104, it is judged whether or not the time-synchronization process has been performed. If the time-synchronization process has been performed, control is passed to S122. Otherwise, control is passed to S106.

In S106, the hello receiving process is performed. The hello receiving process is illustrated in detail in FIG. 7.

In the process illustrated in FIG. 6, the judgment as to whether or not hello has been received is not included. However, as described above, a new node is in the state in which a hello message may be received. Although the data included in the hello message is not decrypted, the local source address included in the ad hoc header is transmitted without decryption. Therefore, the address may be read.

The hello receiving process is described with reference to FIG. 7. When the hello receiving process is started, the number of times of the hello consecutive reception indicating how many times the hello message is consecutively received from the same node is reset.

Figure 8:
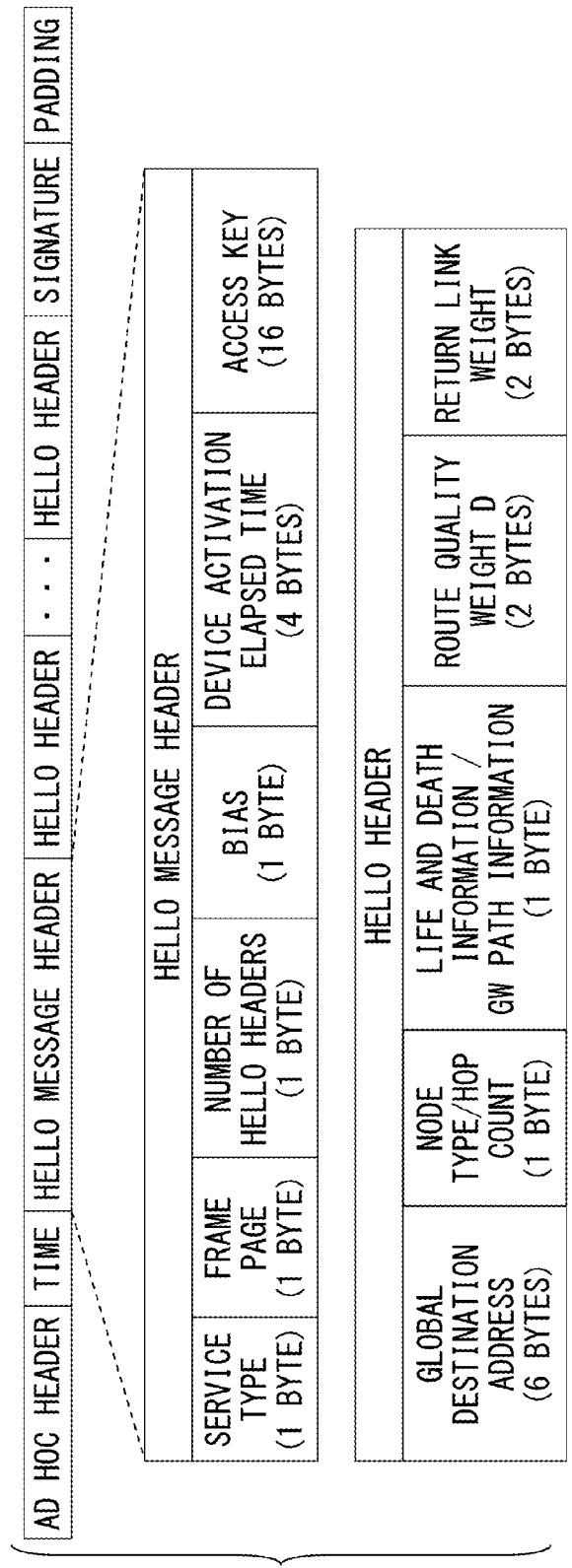
FIG. 8 is an example of a frame format of a hello message.

FIG. 8 is an example of a frame format of the hello message.

The hello message includes an ad hoc header, time, a hello message header, and a hello header.

Although not illustrated in an example of an ad hoc header, the header includes a local destination address, a local source address, a frame type, a frame size, etc. The local destination address is an ID of the destination node device indicating the adjacent node to which the frame is to be passed. The local source address is an ID of the node device as a direct source from which the frame is transmitted to the local destination address. The frame refers to a data unit to be processed by the protocol, and the type includes a hello frame, a data frame, an ACK frame, etc. The hello frame is a frame transmitted for confirmation of the existence and state of the device which configures or is configuring a node. The data frame refers to the data to be transmitted by the network from the starting node to the destination coal node. The frame type refers to the type of a frame. The frame size refers to the size of a frame.

The ad hoc header includes a local source address. As described above, since the ad hoc header is transmitted without encryption, a new node which monitors the hello message header may be informed of the address of the source node of the hello message header. According to the information about the address, the time-synchronization request frame may be transmitted.

In an example of the hello message header, a service type (1 byte), a frame page (1 byte), the number of hello headers (1 byte), a bias (1 byte), device activation elapsed time (4 bytes), and an access key (16 bytes) are included.

Normally, in an example of a hello header which is transmitted with encryption, a global decryption address, a node type/hop count, life-and-death information/GW bus information, a route quality weight d, and a return link weight. The global destination address refers to a node ID as the final destination of a data frame. The node type/hop count includes the information about whether or not it is a gateway GW. If it is not a gateway GW, the information indicates the hop count from the gateway GW. The life-and-death information/GW bus information includes the operation state of a node, and the bus information for a gateway GW. The route quality weight d indicates a value of the communication quality on the route to the global destination address. The return link weight refers to a weight relating to the frame communicated in the return route. In the present embodiment, the hello header includes the route quality weight and the return link weight as the weight assigned to a route. However, the weight is not limited to them. For example, an outward link weight, a bidirectional link weight, etc. may be used.

In S200 in FIG. 7, it is judged whether or not the received signal intensity of the hello message received from the node currently being monitored is equal to or exceeds a specified threshold, that is, an RSSI threshold. Simultaneously, it is confirmed that the node ID of the source of the hello message, for example, a MAC address is not listed as a time-synchronization requested MAC address, and the time-synchronization request Flg is "0". If the MAC address of the source device of the hello message is not listed as a time-synchronization requested MAC address, the time-synchronization request Flg indicates "0", and the RSSI value of the received hello message is equal to or exceeds the RSSI threshold, then the node which has transmitted the hello message is defined as a monitor target. The number of times of consecutive reception of hello is set to "0" (reset), and control is passed to S202. If the judgment in S200 is NO, the hello receiving process is terminated.

In S202, it is judged whether or not the hello monitor flag is set, that is, whether or not "hello monitor Flg=1" holds true. If the judgment result is YES, control is passed to S204. Otherwise, control is passed to S208.

In S204, it is judged whether or not the MAC address of the source of the hello message being monitored is identical to the MAC address of the source of the just received hello message. The MAC address of the source of the hello message is the local source address of the ad hoc header. If the judgment result is YES, that is, the MAC address of the source of the hello message being monitored is identical to the MAC address of the source of the just received hello message, then control is passed to S206 to reset the hello monitor and pass control to S214.

If the judgment result in S204 is NO, that is, the MAC address of the source of the hello message being monitored is different from the MAC address of the source of the just received hello message, then the hello receiving process is terminated.

If the judgment in S202 is that the hello monitor flag is not set, that is, "hello monitor flag=0" holds true, then it is not a hello message transmitted from the currently monitoring node. Therefore, control is passed to S208, and it is judged in S208 whether or not the MAC address of the source of the hello message being monitored is identical to the MAC address of the source of the just received hello message.

If the judgment in S208 is YES, that is, the MAC address of the source of the hello message being monitored is identical to the MAC address of the source of the just received hello message, then the hello receiving process is terminated.

If the judgment in S208 is NO, that is, the MAC address of the source of the hello message being monitored is not identical to the MAC address of the source of the just received hello message, then control is passed to S210.

In S210, the node ID of the source of the hello message, for example, the MAC address is held, the hello monitor Flg is set to 1, and the number of times of consecutive reception of hello is reset. Then, control is passed to S212 to reset the hello monitor timer and pass control to S214. By the process, the node which monitors the hello message may be changed.

In S214, the number of times of consecutive reception of hello is incremented by 1, and control is passed to S216.

In S216, it is judged whether or not the number of consecutive reception of hello is equal to or exceeds a specified threshold, that is, a hello consecutiveness threshold. The hello consecutiveness threshold is set in advance. If the judgment is NO, the hello receiving process is terminated. If the judgment in S216 is YES, control is passed to S218.

In S218, the hello monitor Flg is set to "0", and the time-synchronization request Flg indicating whether or not a time-synchronization request is to be issued is set to "1". Then, control is passed to S220.

In S220, the time-synchronization request frame transmitting process is performed.

Figure 9:
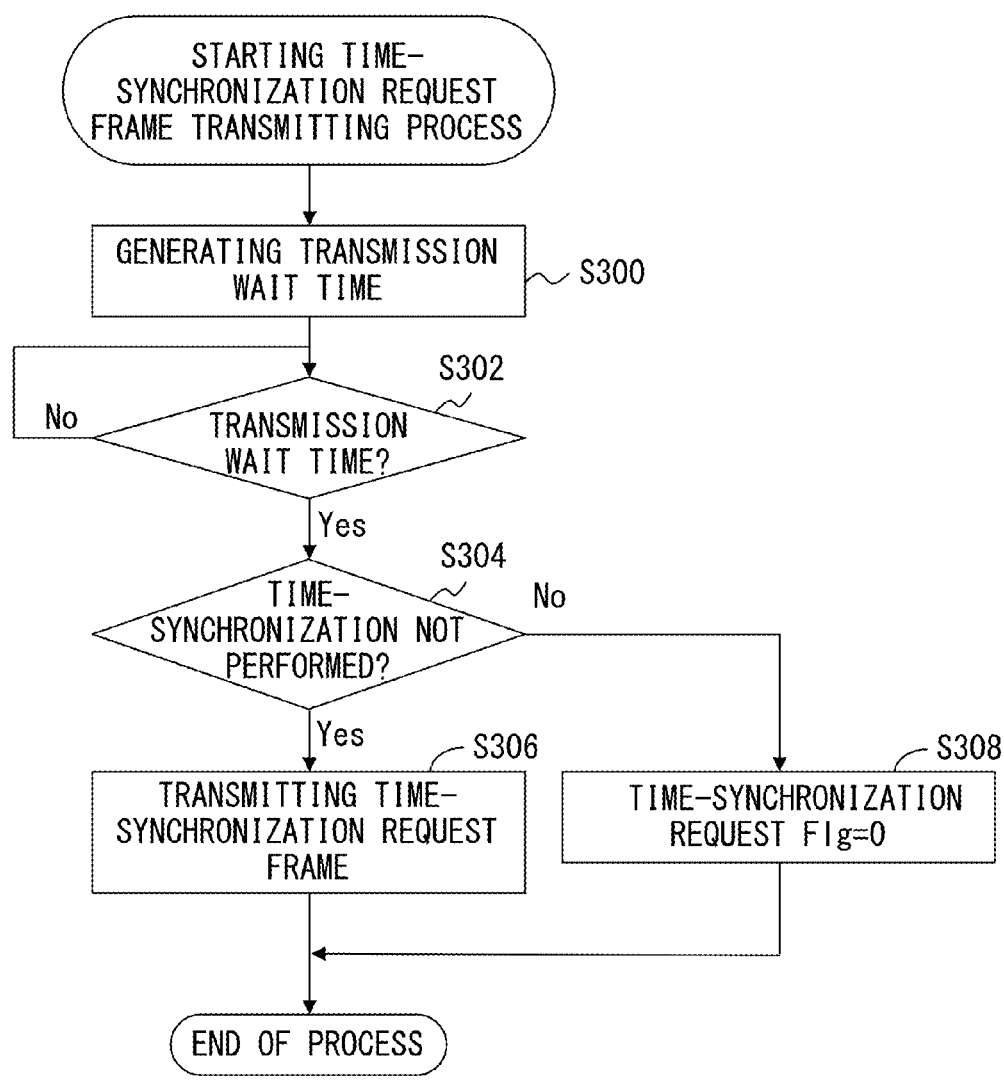
FIG. 9 is a flowchart of the time-synchronization request frame transmitting process of the node device according to an embodiment of the present invention.

The time-synchronization request frame transmitting process is illustrated in detail in FIG. 9.

When the time-synchronization request frame transmitting process is started, the timer count is started.

In S300, transmission wait time is generated. After the transmission wait time has passed, a time-synchronization request frame is transmitted. It is preferable that the transmission wait time may be set at random within a specified range to avoid the congestion by a broadcast from a neighboring node. An example of a specified range may be 30 seconds, 60 seconds, 90 seconds, etc.

In S302, it is judged whether or not the elapsed time from the start of the time-synchronization request frame transmitting process has exceeded the transmission wait time. If the elapsed time has not exceeded the transmission wait time, the process in S302 is repeated until the elapsed time exceeds the transmission wait time. When the elapsed time exceeds the transmission wait time, control is passed to S304.

In S304, it is executed whether or not the time-synchronization process has been performed. If the judgment is NO, that is, the time-synchronization process has been performed, then the time-synchronization request frame transmitting process is terminated with the time-synchronization request Flg set to "0".

If the judgment result in S304 is YES, the source node of the hello message has not been time-synchronized. Therefore, control is passed to S306, the time-synchronization request frame is transmitted, and the time synchronous frame transmitting process is terminated. Furthermore, when the time-synchronization request frame is transmitted, the elapsed time count is started. The elapsed time is called time-synchronization reply wait time. In addition, the number of times of retransmission of the time-synchronization request frame is reset.

FIG. 10 is an example of a format of the time-synchronization request frame transmitted in S306. In the example of the time-synchronization request frame, time-synchronization information is included in addition to the ad hoc header. The time-synchronization information includes a time-synchronization request destination address (6 bytes). The time-synchronization request destination address may be acquired by monitoring the hello message.

In S220 in FIG. 7, when the time-synchronization request frame transmitting process is terminated, the hello receiving process in S106 in FIG. 6 terminates. Then, control is passed to S108 in FIG. 6.

In S108, it is judged whether or not the time-synchronization request Flg is "1". After the time-synchronization request Flg indicates "1" in S216 in the hello receiving process in S106 in FIG. 6, that is, in FIG. 7, the time-synchronization request frame transmitting process is performed. Therefore, when the time-synchronization request frame transmitting process is started, the time-synchronization request Flg indicates "1". Since the time-synchronization request Flg is set in S308 in FIG. 9, there is the possibility that the time-synchronization request Flg is not "1" in S108. In this case, control is returned to S106. If the time-synchronization request Flg indicates "1" at the judgment in S108, control is passed to S110.

In S110, it is judged whether or not the time-synchronization reply wait time has exceeded a specified value. If the judgment in S110 is YES, that is, the time-synchronization reply wait time has exceeded the specified value and indicates a time-out, control is passed to S112, and the time-synchronization reply wait time timeout process is performed. If the judgment in S110 is NO, that is, the time-synchronization reply wait time has not exceeded the specified value, the time-synchronization reply frame is received, and no time-out occurs, then control is passed to S118.

Figure 11:
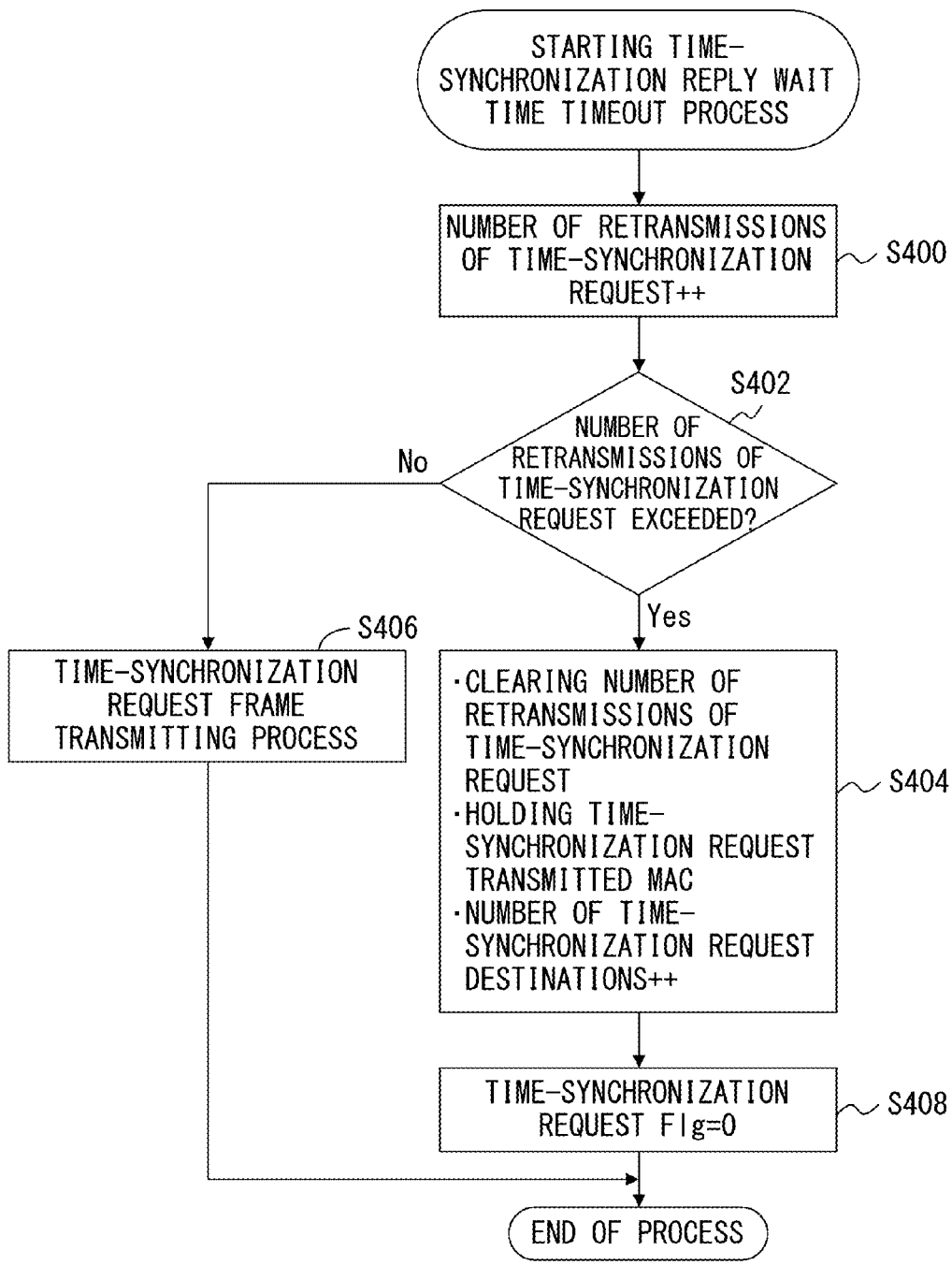
FIG. 11 is a flowchart of the time-synchronization reply wait time timeout process of the node device according to an embodiment of the present invention.

In S112, the time-synchronization reply wait time timeout process is performed. The process is illustrated in detail in FIG. 11. FIG. 11 is a flowchart of the time-synchronization reply wait time timeout process of a node device.

In S400, the number of times of retransmission of the time-synchronization request frame is incremented by 1. In S402 after S400, it is judged whether or not the number of times of retransmission of the time-synchronization request frame has exceeded the specified value. Unless the number of times of retransmission of the time-synchronization request frame has exceeded the specified value, that is, if the judgment result is NO, then control is passed to S406. In S406, the time-synchronization request frame transmitting process is performed. The time-synchronization request frame transmitting process is illustrated in FIG. 9. When the time-synchronization request frame transmitting process is terminated, the time-synchronization reply wait time timeout process terminates.

If the judgment in S402 is YES, that is, the number of times of retransmission of the time-synchronization request frame has exceeded the specified value, control is passed to S404. In S404, the number of times of retransmission of the time-synchronization request frame is reset, the MAC address of the time-synchronization request transmission completion node is stored, and the number of time-synchronization request destinations is incremented.

In S408 after S404, the time-synchronization request Flg is set to "0", thereby terminating the time-synchronization reply wait time timeout process.

Thus, a new node transmits the time-synchronization request frame in S406 in FIG. 11 to the node as a destination of the received hello message. The time-synchronization request frame is also transmitted in S306 in FIG. 9, and the process performed in S406 in FIG. 11 is a retransmitting process.

When the time-synchronization reply wait time timeout process in S112 in FIG. 6 is terminated, control is passed to S114. In S114, it is judged whether or not the time-synchronization request Flg indicates "0" if the time-synchronization request Flg is "0" in the time-synchronization reply wait time timeout process (S408 in FIG. 11), then the judgment in S114 is YES. If S402 is NO in the time-synchronization reply wait time timeout process, that is, in FIG. 11, the judgment in S114 is NO, and control is returned to S110. If the judgment in S114 is YES, control is passed to S116.

In S116, it is judged whether or not the number of nodes which is monitoring the hello message has exceeded the limited number of monitored hello as a specified value. The number of nodes which is monitoring the hello message matches the number of destinations of time-synchronization request. If the judgment in S116 is NO, control is returned to S106, and a hello message is received from another node.

Otherwise, that is, if the number of nodes which are monitoring the hello message has exceeded the limited number of monitored hello, then the time-synchronization request process is terminated.

If the judgment in S110 is NO, that is, the time-synchronization reply frame is received without the time-synchronization reply wait time not exceeding a specified value, and no time-out occurs, then control is passed to S118 and the time-synchronization reply frame receiving process is performed.

The hello monitor timer process in FIG. 16 is performed concurrently with the time-synchronization request process in FIG. 6. In this process, when a new node receives no hello message in a specified time period from a node to be monitored, the node to be monitored is removed from monitor targets, and waits for receiving a new hello message.

In the hello monitor timer process, first in S700 in FIG. 16, it is judged whether or not the hello monitor Flg is "1". The hello monitor Flg is set in S208 in FIG. 7. If the judgment is YES, control is passed to S702. On the other hand, if the hello monitor Flg is not "1", but "0", no hello message is being monitored, and the hello monitor timer process is terminated.

In S702, the hello monitor elapsed time is counted. In the next S704 after S702, it is judged whether or not the hello monitor elapsed time is equal to or exceeds the product of the transmission period of the hello message and the specified number of wait times of hello reception. The number of wait times of hello reception is a value set in advance. It may be, for example, 1, 5, or a non-integer value. If the judgment is YES, hello monitoring is not required. Therefore, the process is terminated in S706 with the hello monitor Flg set to "0". If the judgment in S704 is NO, control is returned to S700.

The hello monitor timer process continues until the hello monitor Flg is not "1" in S700 or the hello monitor elapsed time exceeds a specified time period. In S704, unless a hello message is received in a time period assigned by the product of the transmission period of the hello message and the specified number of wait times of hello reception, the hello monitor Flg is set to "0" in S706. If the hello monitor Flg is "0", the new node stops monitoring the hello message transmitted from the currently monitored node.

Thus, while the hello monitor Flg is "1", the hello message monitoring process continues. However, when the hello monitor Flg is "0", the hello message monitoring process is stopped.

The hello monitor timer is reset in S206 and S212 in FIG. 7. That is, unless the processes in S214 and S216 after S206 and S212 are performed while the hello monitor timer process is being performed, the hello monitor Flg is "0" in S796 in FIG. 17 before the hello monitor Flg is "0" in S218, thereby terminating the time-synchronization request process.

<Time-Synchronization Reply Frame Transmitting Process>

The process (in S106 in FIG. 6) of the node which receives the time-synchronization request frame, which has been transmitted from a new node in S220 in FIG. 7, is described below with reference to FIGS. 12 and 13.

FIG. 12 is a flowchart of the process relating to the frame receiving process of the node which belongs to an existing network. When the node which has received the time-synchronization request frame is the gateway GW, the time-synchronization reply frame is transmitted if the gateway GW has been time-synchronized. Unless the time-synchronization has been completed, the time-synchronization reply frame is not transmitted.

If the node which has received the time-synchronization request is a non-GW node, and only if the time-synchronization is acquired by receiving the time-synchronization request frame or the time synchronous frame, the time-synchronization reply frame is transmitted.

In S500, it is judged whether the received frame is addressed to the local device or broadcast. If it is addressed to the local device or broadcast, there is the possibility that it is a time-synchronization request frame. If it is broadcast, there is the possibility that the frame refers to, for example, a hello message. The judgment in S500 refers to a frame addressed to the local device or broadcast, control is passed to S502. If the judgment in S500 is NO, that is, it is not addressed to the local device or not broadcast, control is passed to S504. In S504, the received frame is discarded and the process is terminated.

In S502, the received frame is allocated. Unless the received frame is a time-synchronization request frame, control is passed to S506 and the data receiving process is performed in S506. If the judgment in S502 refers to that the received frame is a time-synchronization request frame, control is passed to S508.

In S508, the time-synchronization request frame transmitting process is performed.

The time-synchronization reply process is described in detail with reference to FIG. 13. FIG. 13 is a flowchart of the flow of the time-synchronization reply frame transmitting process.

The node which has received a time-synchronization request frame from the new node generates a time-synchronization reply frame in S600.

The time-synchronization reply frame includes time-synchronization information in addition to an ad hoc header, a time value, a signature. The time-synchronization information includes a HOP count (1 byte), NTP completion time (8 bytes), time synchronous frame transmission time (8 bytes), and device activation elapsed time (4 bytes). The HOP count is, for example, the information about the hop count from the new node which has transmitted the time-synchronization request frame to the node which is transmitting a time-synchronization reply frame. The NTP completion time refers to the time when the process of the NTP is completed between the gateway GW and the network server (NTP server). The time synchronous frame transmission time refers to the time when a time synchronous frame is transmitted from the node. The time-synchronization reply frame has the same format as the time synchronous frame.

When the process of generating a time-synchronization reply frame is completed in S600, control is passed to S602. In S602, the time-synchronization reply frame generated in S600 is transmitted (may be broadcast) to a new node which has transmitted the time-synchronization request frame.

<Time-Synchronization Reply Frame Receiving Process>

If the judgment in S110 in FIG. 6 is NO, that is, a time-synchronization reply frame is received with the time-synchronization reply wait time not exceeding a specified value without a time-out, then the time-synchronization reply frame receiving process in S118 is performed.

The new node transmits a time-synchronization request frame to the node which belongs to an existing network (FIG. 7). The node which has received the time-synchronization request frame immediately transmits a time-synchronization reply frame to a new node. Next, the new node which receives the time-synchronization reply frame from the node which belongs the existing network performs the time-synchronization reply frame receiving process in S118 in FIG. 6. The process is described below with reference to FIG. 14.

In S800, a time-synchronization reply frame is received. In the present embodiment, the format of the time-synchronization reply frame is the same as the format of the time synchronous frame. The time-synchronization reply frame includes time-synchronization information as described above with reference to FIG. 15. In the present embodiment, although the format of the time-synchronization reply frame is the same as the format of the time synchronous frame, it is not a necessary condition so far as time-synchronization information is included.

In S802 after S800, a new node performs time-synchronization with a node which belongs to an existing network according to the time-synchronization information included in the time-synchronization reply frame. Thus, the new node may be time-synchronized with the node which belongs to an existing network.

When the process in S802 is completed, the time-synchronization request Flg is set to "0", thereby terminating the time-synchronization reply frame receiving process.

When the time-synchronization reply frame receiving process terminates, the time-synchronization request process in FIG. 6 also terminates.

Thus, in the method according to the present invention, if the address of the node which belongs to an existing network is acquired from a hello message, and a request to transmit to the local device or broadcast a time-synchronization reply frame having the same format as the time synchronous frame is issued to the node, then the local device may be time-synchronized with a network without waiting for a time synchronous frame.

(Configuration of Node)

The configuration of a node which performs the above-mentioned process is described with reference to FIG. 17.

FIG. 17 is an example of a configuration of the node device for performing the above-mentioned time-synchronization process. As illustrated in FIG. 17, a node device 1000 includes an interface unit 1100 and a time-synchronizing unit 1200. The interface unit includes a reception unit 1110 and a transmission unit 1120, and performs a process for communication with other node devices. When a communication between nodes is performed by wireless, the reception unit 1110 and the transmission unit 1120 may be respectively configured as a receiver and a transmitter. When the link between nodes is established by cable, the reception unit 1110 and the transmission unit 1120 may be a processing unit processing of the input/output interface of a general-purpose computer.

The interface unit 1100 is connected to the time-synchronizing unit 1200. In more detail, the time-synchronizing unit 1200 includes a hello control unit 1230, a time initial value judgment unit 1220, a time-synchronization control unit 1240, and a frame transmission control unit 1250.

An external signal received by the reception unit 1110 of the interface unit 1100 judges whether the received frame is addressed to the local device or broadcast (process in S500 in FIG. 12), and performs the process of allocating a frame (process in S502 in FIG. 12) when the frame is addressed to the local device. Furthermore, the frame reception processing unit 1210 performs the data receiving process (S506 in FIG. 12) if the frequency is not a time-synchronization request frame, and performs the time-synchronization reply frame transmitting process (S508 in FIG. 12) if the frame is a time-synchronization request frame.

Upon receipt of the hello message, the frame reception processing unit 1210 transmits a signal to the time initial value judgment unit 1220. The time initial value judgment unit 1220 performs the processes in S100 through S104 in FIG. 6. The time initial value judgment unit 1220 is connected to the hello control unit 1230. The hello control unit 1230 performs the processes in S106 through S110 and S112 through S116 in FIG. 6.

The hello control unit 1230 includes memory for storing in advance a time period from the activation to the starting time of hello monitoring, a hello consecutiveness threshold, a number of wait times of hello reception, a hello monitor Flg, a number of times of hello consecutive reception, a limited number of monitored hello, etc. The memory may temporarily store the information included in the hello message, for example, the data such as a local destination address included in the ad hoc header. Furthermore, the hello control unit 1230 includes volatile memory for holding the hello monitor Flg, monitors the hello message periodically transmitted by a currently monitored node only when "hello monitor Flg=1" holds true, and terminates the above-mentioned process when the hello monitor Flg is "0". Furthermore, the hello control unit 1230 includes volatile memory for storing a node ID of the source of the hello message, for example, a MAC address, and a number of times of hello consecutive reception.

Figure 13:
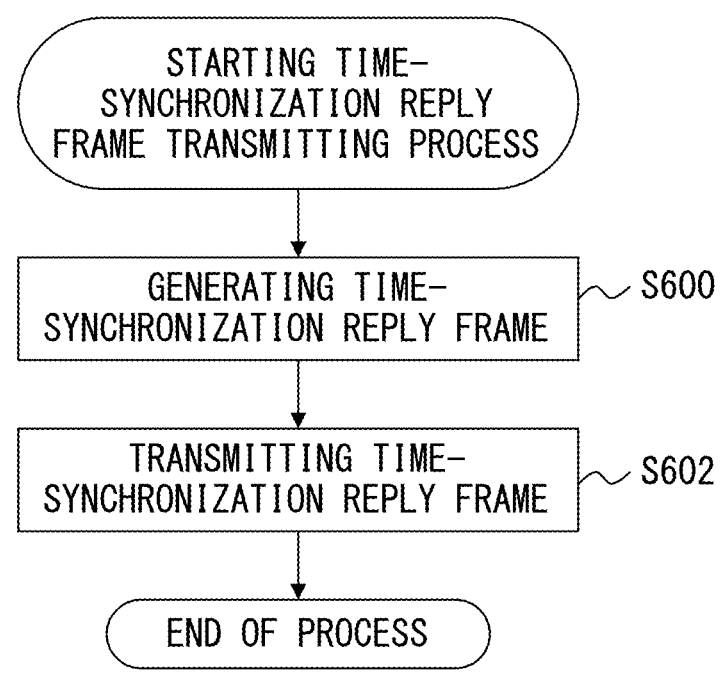
FIG. 13 is a flowchart of the time-synchronization reply frame transmitting process of a node device according to an embodiment of the present invention.
Figure 14:
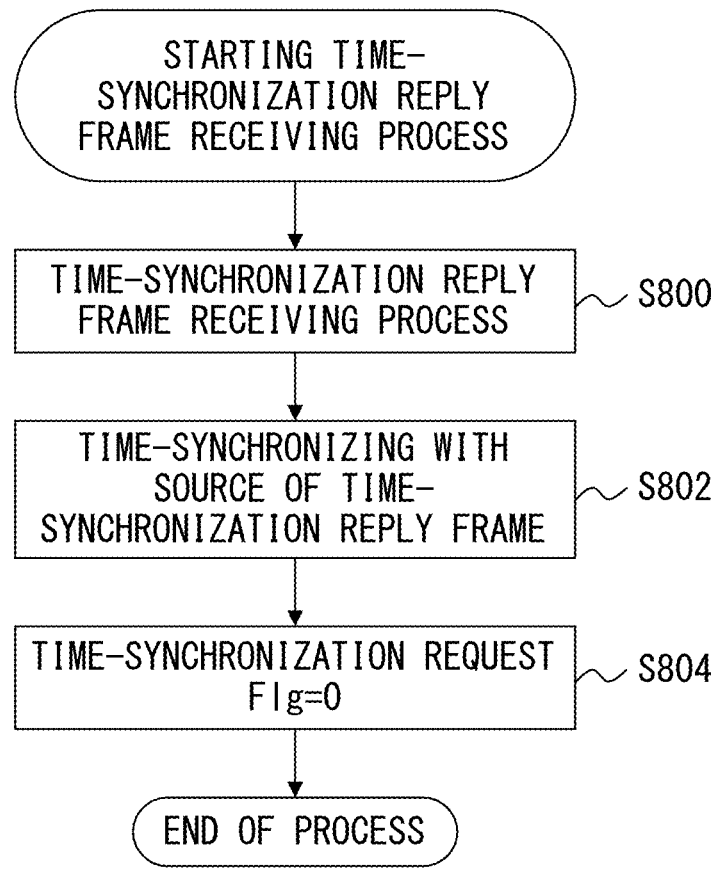
FIG. 14 is a flowchart of the time-synchronization reply frame receiving process of a node device according to an embodiment of the present invention.

The time-synchronization control unit 1240 and the frame transmission control unit 1250 connected to the hello control unit 1230 perform the time-synchronization reply frame receiving process (S118 in FIG. 6, FIG. 14) and the time-synchronization reply frame transmitting process (FIG. 13). The time-synchronization control unit 1240 includes memory for storing the time-synchronization request Flg. Furthermore, the configuration is designed not to transmit a time-synchronization request frame while "time-synchronization request Flg 0" holds true.

In addition, upon receipt of a hello message, the hello control unit 1230 registers in the route information table the source of the hello message received in the route information table (also referred to as a routing table). Furthermore, the route quality and the communication quality of the inter-node link are calculated using the node information included in the received hello message, and the result is registered in the route information table and the link information table (also called a link table) in the local device. The hello control unit 1230 includes the memory for storing the route information table and the link information table. Then, the hello control unit 1230 controls the transmission unit 1120 to transmit a hello message including the information registered in the route information table and the link information table.

Furthermore, the time-synchronization control unit 1240 performs the time-synchronization by setting the time of the local device as the time information in the received time-synchronization reply frame when the time-synchronization reply frame is received. The frame transmission control unit 1250 controls the transmission unit 1120 of the interface unit 1100, thereby transmitting a frame.

The time-synchronization control unit 1240 includes the memory for storing the number of times of retransmission etc. of the time-synchronization request frame.

The node device 1000 also broadcasts again the received time information about the node if it is an initial value, and otherwise does not broadcast again the information, but each node transmits the time synchronous frame in the period set at random. Also with the time-synchronization reply frame having the same format as the time synchronous frame, the received time-synchronization reply frame may be broadcast again.

The reception unit 1110, the frame reception processing unit 1210, and the hello control unit 1230 configure a message receptor for receiving a message including one address of a node which belongs to a network when the node device 1000 is a new node. In addition, the hello control unit 1230, the frame transmission control unit 1250, and the transmission unit 1120 configure a message receptortime-synchronization request frame transmitter for transmitting to one of a plurality of nodes which belong to an ad hoc network a time-synchronization request frame including the address of the node. The message receptortime-synchronization request frame transmitter may be configured to transmit a time-synchronization request frame when a hello message is received a specified number of times or more frequently consecutively in a specified time period.

When the node device 1000 is a new node, the reception unit 1110 and the frame reception processing unit 1210 configure a time-synchronization reply frame receptor which receives a time-synchronization reply frame including time-synchronization information. Furthermore, the time-synchronization control unit 1240 configures a time-synchronizer which is time-synchronized with one of the plurality of nodes according to the time-synchronization information included in the time-synchronization reply frame.

The reception unit 1110, the frame reception processing unit 1210, and the hello control unit 1230 configure a node selector which selects a node to be monitored depending on the signal intensity of the hello message.

Although not illustrated in the attached drawings, the node device 1000 includes a clock or a timer for time count.

The entire configuration of the present system is described above, but the node device 1000 is to have a normal computer function. With the above-mentioned hardware condition, the process of each component of the node device 1000 may be executed by a software program installed into a general-purpose computer that includes a processor and other hardware elements such as memory, an input/output (I/O), and etc., or by dedicated hardware. For example, the reception unit 1110 and the transmission unit 1120 of the interface unit 1100 may correspond to the processor, and the hello control unit 1230, the time initial value judgment unit 1220, the time-synchronization control unit 1240, and the frame transmission control unit 1250 of the time-synchronizing unit 1200 may correspond to the processor when the node device 1000 is constructed using the general-purpose computer. However, some of the reception unit 1110, the transmission unit 1120, the hello control unit 1230, the time initial value judgment unit 1220, the time-synchronization control unit 1240, and the frame transmission control unit 1250 may be made as a dedicated hardware.

By the above-mentioned process and device, after the activation of a new node, a time-synchronization request frame may be transmitted from the new node to a node which belongs to a time-synchronized network, and the new node may be time-synchronized using the time-synchronization reply frame transmitted from the node which belongs to a time-synchronized network to the new node. Therefore, the time taken to allow a new node device to enter an existing network may be shortened, thereby also shortening the re-creation time of a network.

Furthermore, with the above-mentioned process and device, the time taken to enter a network is shortened when a maintenance node for maintenance as a new node is added to an existing network. Therefore, the maintenance may be smoothly performed.

Furthermore, with the above-mentioned process and device, when a plurality of nodes which simultaneously start from a general power supply enter a time-synchronized existing network, and one of the nodes transmits a time-synchronization request frame, a time-synchronization reply frame may be broadcast from a time-synchronized node which has received the time-synchronization request frame, thereby allowing the plurality of nodes to simultaneously perform time-synchronization and enter an existing network. Therefore, the volume of packets communicated in a network may be reduced without transmitting excess time-synchronization request frames.

In the above-mentioned method for time synchronization, it is first judged whether or not the time of a new node refers to a first time value. However, by omitting the judgment, it is also possibility to provide a method for allowing a new node which is not a newly activated device to be time-synchronized with a node which belongs to an existing network.

Embodiment 1

An example of allowing a new node to enter an existing network is described below by using the method for time synchronization according to the present invention with reference to FIG. 18.

Figure 18:
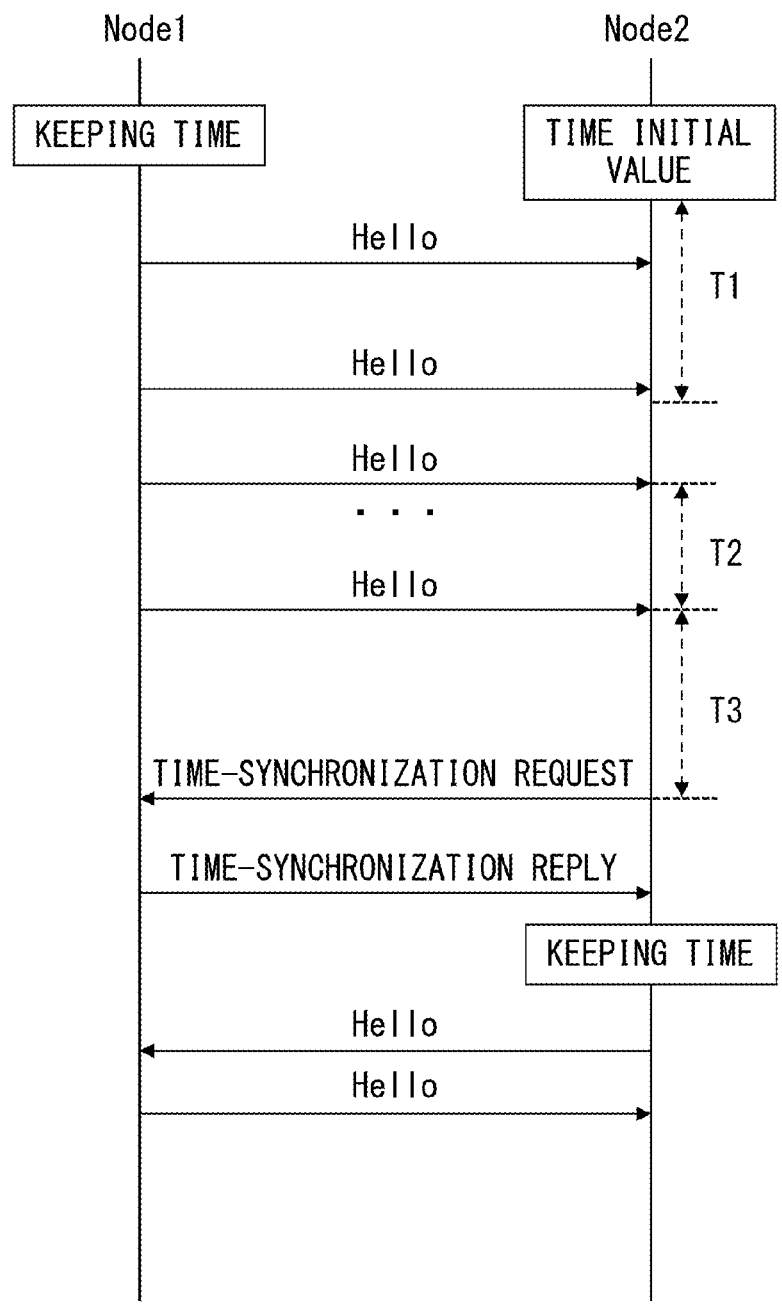
FIG. 18 is a timing chart of the flow of the process of the embodiment 1.

FIG. 18 is a sequence of entering network by a new node (Node 2) time-synchronized with a node (Node 1) which belongs to an existing network.

At the first stage of the present embodiment, the new node (Node 2) is not time-synchronized with a network. Furthermore, in the present embodiment, the time value held by the internal clock of Node 2 is a time initial value. For example, if the node previously belonged to a network, but has removed from the network, then the internal clock of Node 2 does not necessarily have a time initial value. Time T1 after the activation refers to a time period before starting the monitor of a hello message. The time T1 may be adjusted. In the case in FIG. 8, the time T1 is two times or more the transmission period of Node 1 which belongs to an existing network broadcasting a hello message. When the time of the internal clock of Node 2 is a time initial value, the monitor of the hello message is immediately started.

In the present embodiment, it is judged that a time-synchronization request frame is issued if the hello message from Node 1 is received N times (N is a positive integer) continuously in the time period T2. N may be 1. On the other hand, unless the hello message is received N times continuously in the time period T2, the reception of the hello message from Node 1 is given up, and the hello message from another node is monitored.

After the passage of the time T3 after the judgment that the time-synchronization request frame is to be issued to Node 1 by receiving the hello message from Node 1 N times (N is a positive integer) in the time period T2, Node 2 transmits a time-synchronization request frame to Node 1. The time T3 may also be adjusted. For example, T3 may be 60 seconds.

Node 1 receives the time-synchronization request frame, and then immediately transmits a time-synchronization reply frame to Node 2 which is a source of the time-synchronization request frame. Upon receipt of the time-synchronization reply frame, Node 2 which has not been time-synchronized may enter an existing network to which Node 1 belongs by performing time-synchronization.

Embodiment 2

The embodiment 2 is described below with reference to FIG. 19.

In the present embodiment, a new node makes an RSSI check in addition to the process according to the embodiment 1 above, and is time-synchronized with a node which is regarded as existing near the local device.

Figure 19:
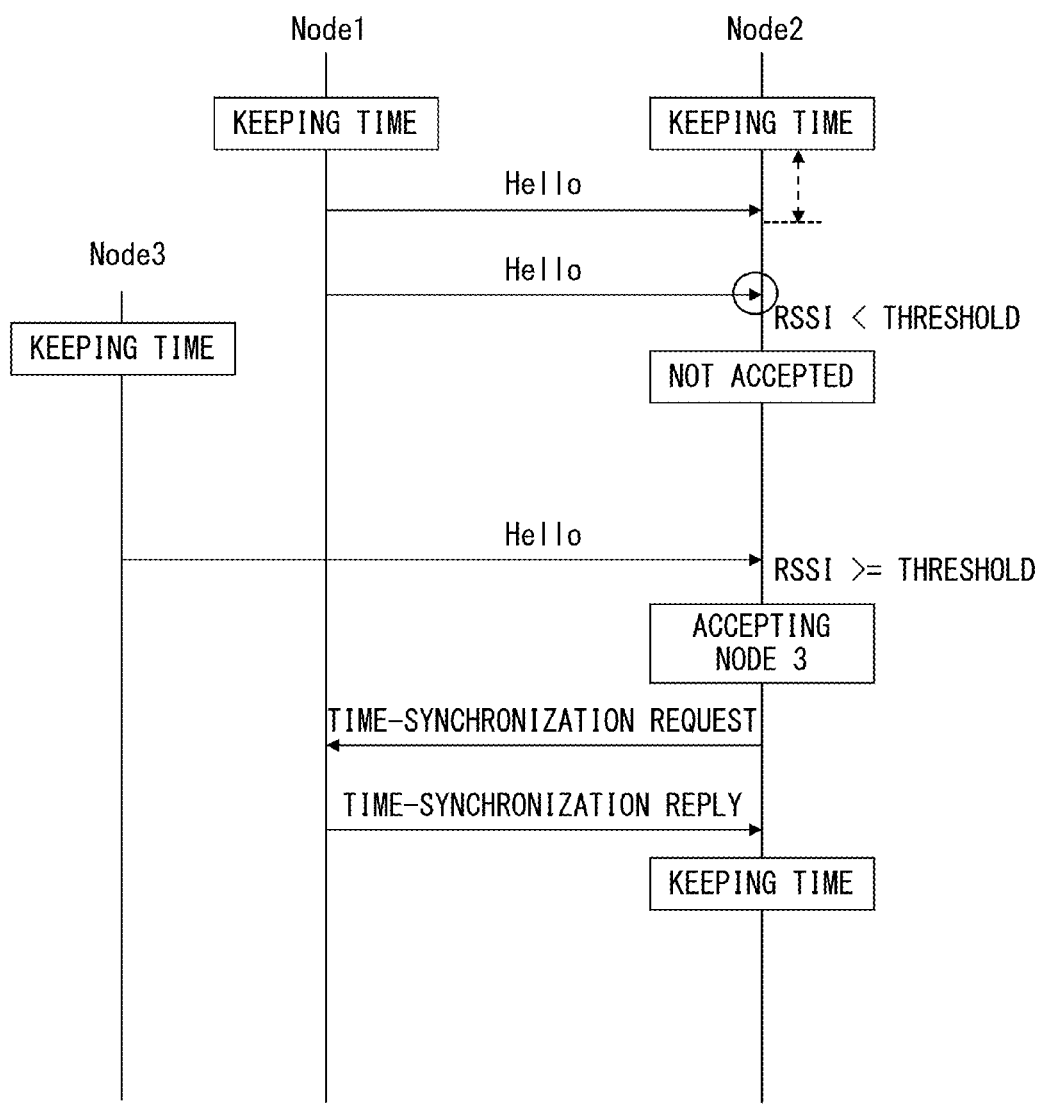
FIG. 19 is a timing chart of the flow of the process of the embodiment 2.

In FIG. 19, Nodes 1 and 3 belong to an existing network and are time-synchronized with each other. Node 2 is a new node which is entering the network to which Nodes 1 and 3 belong.

Node 2 starts monitoring a hello message after the process similar to that according to the embodiment 1 above. However, in the present embodiment, when the RSSI value of the received hello message is smaller than an RSSI threshold, the monitoring operation is not performed. The RSSI threshold may be 20. In FIG. 19, the intensity of the received signal (RSSI) is smaller than the threshold, and it is judged that Node 1 is inappropriate as a node to be monitored.

Node 2 receives a hello message from Node 3 instead of Node 1. If the RSSI of the hello message from Node 3 is equal to or exceeds the RSSI threshold, then Node 3 is to be monitored. The subsequent processing of Nodes 3 and 2 is identical to that according to the embodiment 1.

Embodiment 3

Figure 20:
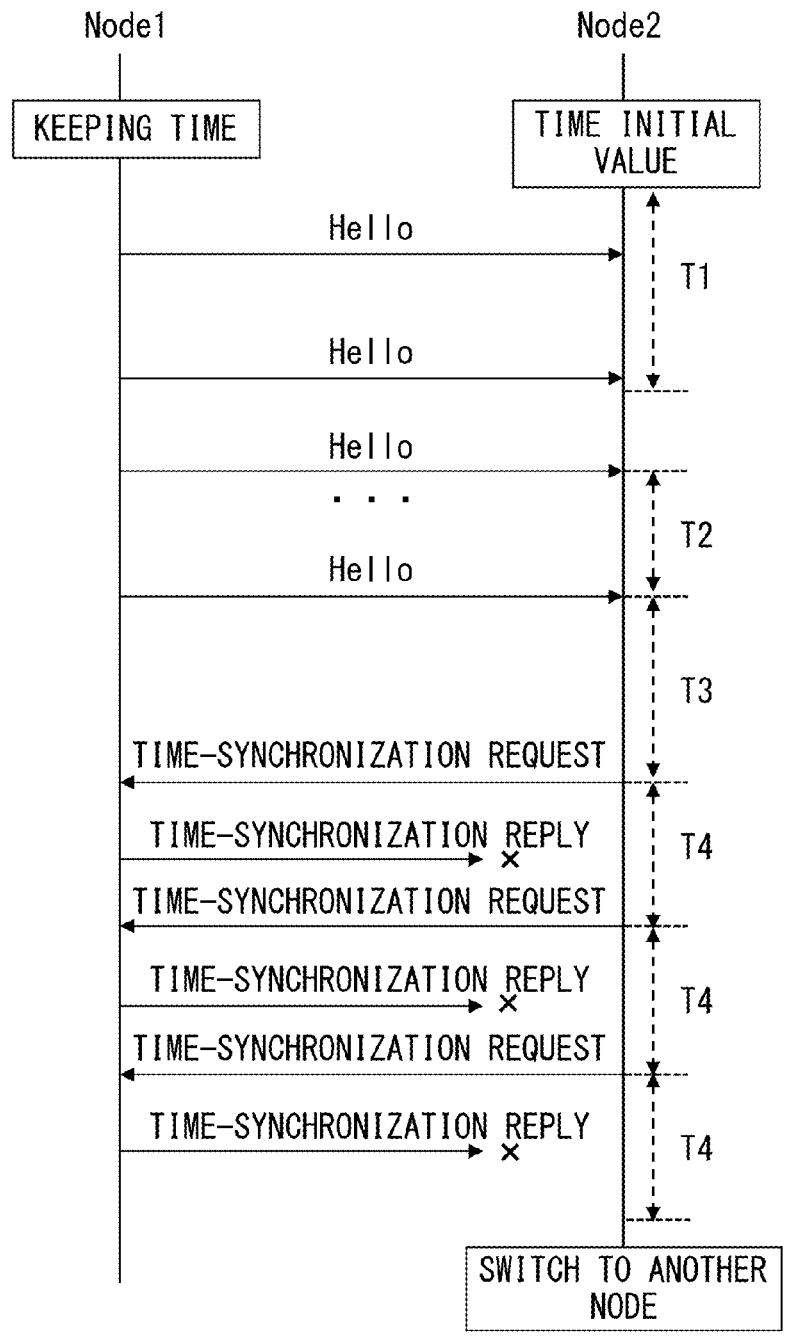
FIG. 20 is a timing chart of the flow of the process of the embodiment 3.

The embodiment 3 is described below with reference to FIG. 20. In the present embodiment, as with the embodiment 1, the new node (Node 2) is time-synchronized with the node (Node 1) which belongs to an existing network, and is applied to the situation of entering a network. However, the embodiment 3 is different from the embodiment 1 in that the new node (Node 2) transmits a time-synchronization request frame to a node (Node 1), but no time-synchronization request frame is returned.

In the present embodiment, Node 2 continuously transmits a time-synchronization request frame to Node 1.

The process is identical to that according to the embodiment 1 until transmitting a time-synchronization request frame from Node 2 to Node 1. If no time-synchronization reply frame is returned when the time-synchronization reply wait time T4 passes after Node 2 transmits a time-synchronization request frame to Node 1, then a time-synchronization request frame is transmitted again. The retransmission of a time-synchronization request frame is performed until a number of retransmissions of time-synchronization request is reached. For example, the time-synchronization reply wait time T4 is 60 seconds. Furthermore, the number of retransmissions of time-synchronization request is, for example, three times.

When the number of retransmissions of a time-synchronization request frame exceeds the number of retransmissions of time-synchronization request, the monitor target of the hello message is changed. In this case, it is preferable that the MAC address of Node 1 has been stored in a new node as an address to which the time-synchronization request frame has been transmitted.

When the monitor target of the hello message is newly found, the time-synchronization request frame is transmitted according to the procedure of the embodiment 1, and then a time-synchronization reply frame is received, thereby performing time-synchronization and entering a network.

Embodiment 4

The embodiment 4 is described with reference to FIG. 21. The present embodiment is related to the case in which the time-synchronization is not performed as with the embodiment 3 although a time-synchronization request is continuously transmitted or a node to be monitored for a hello message is replaced.

Figure 21:
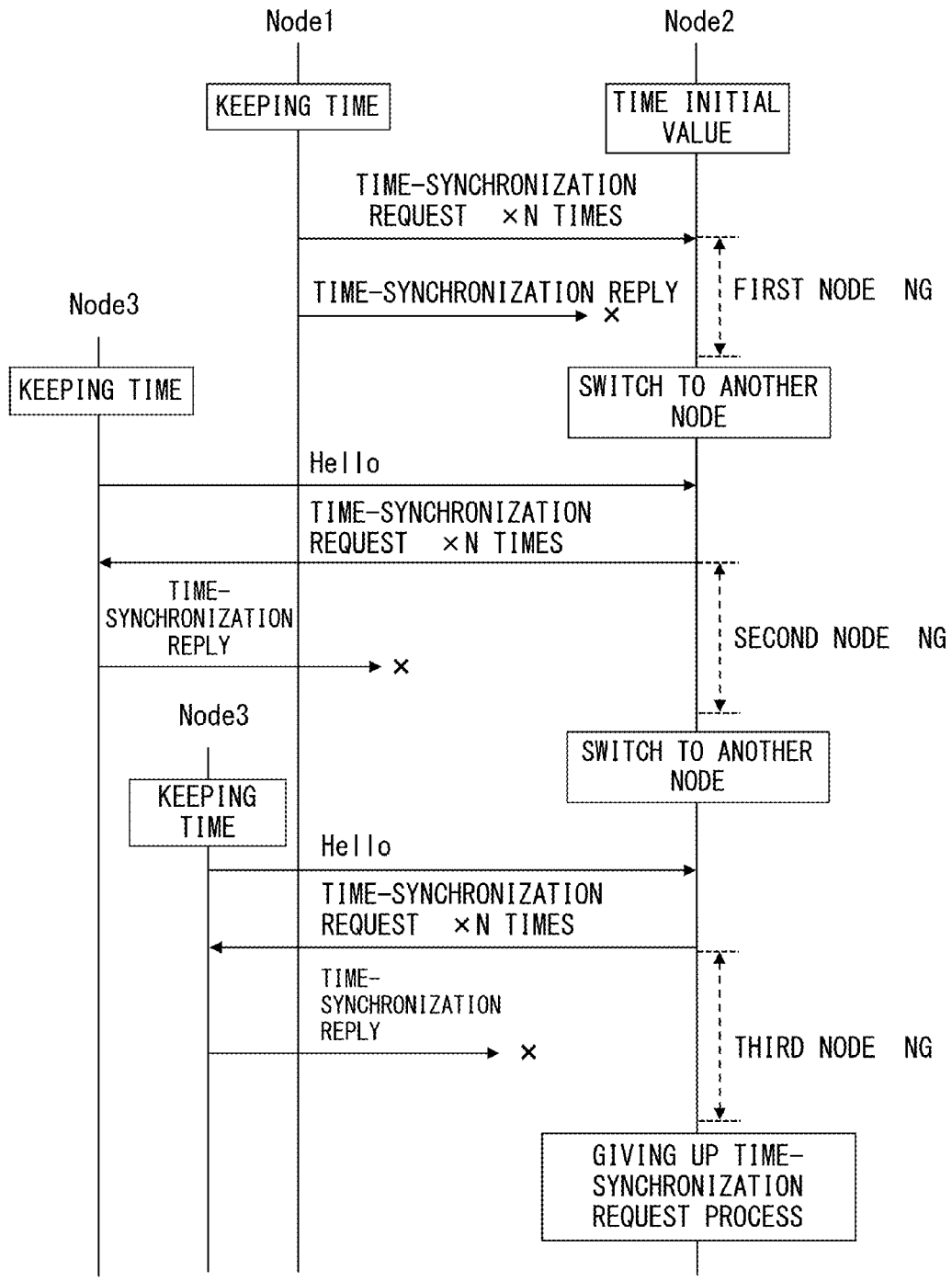
FIG. 21 is a timing chart of the flow of the process of the embodiment 4.

In FIG. 21, it is assumed that Nodes 1, 3, and 4 belong to an existing network, and are time-synchronized with one another. Node 2 is newly entering the network.

Although Node 2 regards Node 1 as anode to be monitored for a hello message, both nodes perform the same process as in embodiment 3. That is, Node 2 is not time-synchronized with Node 1. Then, Node 2 receives a hello message from Node 3, and Node 2 continuously transmits a time-synchronization request frame to Node 3. However, the same holds true with Node 3 as in the embodiment 3, and Node 2 is not time-synchronized with Node 3.

Node 2 tries to be time-synchronized with Node 4 as another node. However, the same holds true with Node 4 as in the embodiment 3, and Node 2 is not time-synchronized with Node 4.

Thus, when the number of times of changing a monitor target for hello message exceeds 3 as the limited number of monitoring, the transmission of a time-synchronization request is terminated. Obviously, the limited number of monitoring is not limited to 3, but, 2, 5, etc. may be accepted. When the transmission of a time-synchronization request is terminated, Node 2 is unable to enter the network to which Nodes 1, 3, and 4 belong.

In this case, the Node 2 receives a time synchronous frame which Nodes 1, 3, and 4 periodically transmit, and then enters the network.

Embodiment 5

The embodiment 5 is described below with reference to FIG. 22. The present embodiment discloses a method for a plurality of nodes which have a short break simultaneously entering an existing network when a part of networks have a short break in an existing network. In the present embodiment, a node which has received a time-synchronization reply frame broadcasts the received time-synchronization reply frame.

Figure 22:
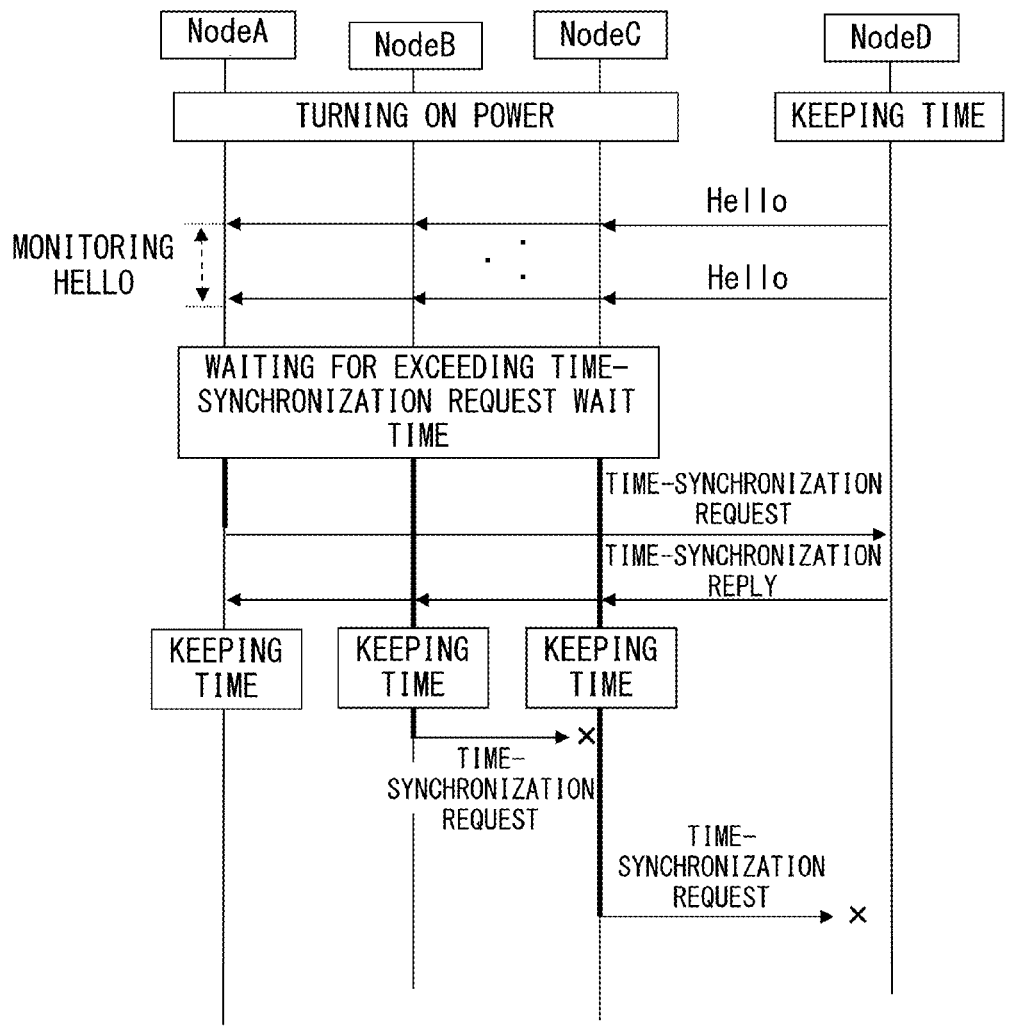
FIG. 22 is a timing chart of the flow of the process of the embodiment 5.

In FIG. 22, Nodes A, B, and C are a plurality of nodes which have a short break. Node D belongs to a time-synchronized network. In the present embodiment, Nodes A, B, and C are entering the network to which Node D belongs.

First, one of Nodes A, B, and C, for example, Node A first exceeds the time-synchronization request wait time, and transmits a time-synchronization request frame to Node D. The process performed from the activation of the device to the transmission of the time-synchronization request frame is identical to the process in the embodiment 1. In this case, Nodes B and C still do not exceed the time-synchronization request wait time.

Next, a time-synchronization reply frame is broadcast from a node which has received the time-synchronization request, for example, Node D. A plurality of nodes which have received a broadcast time-synchronization reply frame, for example, Nodes A, B, and C are time-synchronized using a time-synchronization reply frame from Node D. That is, all of Nodes A, B, and C may be completely time-synchronized using the time-synchronization reply frame from Node D. Thus, all of Nodes A, B, and C may simultaneously enter an existing network.

Nodes B and C which have been in a time-synchronization request wait time waiting state do not transmit a time-synchronization request frame when they are time-synchronized by receiving a time-synchronization reply frame etc.

All examples and conditional language provided herein are intended for pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for time synchronization between a network time of an ad hoc network which is configured by a plurality of time-synchronized nodes and a new node internal clock time, the method comprising:

receiving, by a new node, a message including an address of one of the plurality of time-synchronized nodes which belong to the ad hoc network from the one of the plurality of time-synchronized nodes having a function of receiving a time-synchronization request frame and a function of transmitting a time-synchronization reply frame including time-synchronization information for synchronizing the new node internal clock time to a synchronized internal clock time of the one of the plurality of time-synchronized nodes;

transmitting, by the new node, the time-synchronization request frame including, as a destination of the time-synchronization request frame, the address included in the message, after a specified transmission wait time has passed from a time when the message is received by the new node;

receiving the time-synchronization reply frame including the time-synchronization information transmitted from the destination of the time-synchronization request frame in response to reception of the time-synchronization request frame transmitted by the new node; and performing, by the new node, time-synchronization between the new node internal clock time and the synchronized internal clock time of the one of the plurality of time-synchronized nodes using the time-synchronization information included in the time-synchronization reply frame received from the destination of the time-synchronization request frame.

2. The method according to claim 1, wherein a node to which the message is transmitted transmits to the one of the plurality of time-synchronized nodes the time-synchronization request frame when signal intensity of the message is equal to or exceeds a specified threshold.

3. The method according to claim 1, wherein the time-synchronization request frame is transmitted when the message is received a specified number of times or more continuously within a specified time period.

4. A device for time synchronization between a network time of an ad hoc network which is configured by a plurality of time-synchronized nodes and a new node internal clock time, the device comprising:

a memory, and a processor in a new node configured to read instructions from the memory to execute a process including receiving a message including an address of one of the plurality of time-synchronized nodes which belong to the ad hoc network from the one of the plurality of time-synchronized nodes having a function of receiving a time-synchronization request frame and a function of transmitting a time-synchronization reply frame including time-synchronization information for synchronizing the new node internal clock time to a synchronized internal clock time of the one of the plurality of time-synchronized nodes;

transmitting the time-synchronization request frame including, as a destination of the time-synchronization request frame, the address included in the message received by the new node, after a specified transmission wait time has passed from a time when the message is received by the new node;

receiving the time-synchronization reply frame including the time-synchronization information transmitted from the destination of the time-synchronization request frame in response to reception of the time-synchronization request frame transmitted by the new node; and performing time-synchronization between the new node internal clock time and the synchronized internal clock time of the one of the plurality of time-synchronized nodes using the time-synchronization information included in the time-synchronization reply frame received from the destination of the time-synchronization request frame.

5. The device according to claim 4, further comprising a node selector which controls the time-synchronization request frame transmitter so that the time-synchronization request frame is transmitted to the one of the plurality of time-synchronized nodes when signal intensity of the message is equal to or exceeds a specified threshold.

6. The device according to claim 4, wherein the time-synchronization request frame transmitter transmits the time-synchronization request frame when the message is received a specified number of times or more continuously within a specified time period.

7. A method for allowing a new node to enter an ad hoc network which is configured by a plurality of time-synchronized nodes, the method comprising:

receiving, by the new node, a message including an address of one of the plurality of time-synchronized nodes which belong to the ad hoc network from the one of the plurality of time-synchronized nodes having a function of receiving a time-synchronization request frame and a function of transmitting a time-synchronization reply frame including time-synchronization information for synchronizing a new node internal clock time to a synchronized internal clock time of the one of the plurality of time-synchronized nodes;

transmitting, by the new node, the time-synchronization request frame including, as a destination of the time-synchronization request frame, the address included in the message after a specified transmission wait time has passed from a time when the message is received by the new node;

receiving the time-synchronization reply frame including the time-synchronization information transmitted from the destination of the time-synchronization request frame in response to reception of the time-synchronization request frame transmitted by the new node; and performing, by the new node, time-synchronization between the new node internal clock time and the synchronized internal clock time of the one of the plurality of time-synchronized nodes using the time-synchronization information included in the time-synchronization reply frame received from the destination of the time-synchronization request frame, thereby entering the ad hoc network.

8. A network, comprising:

a first node which belongs to an ad hoc network configured by a plurality of time-synchronized nodes, having a first processor programmed to execute a process including transmitting a message including an address of the first node, receiving a time-synchronization request frame including, as a destination of the time-synchronization request frame, the address of the first node included in the message, and transmitting a time-synchronization reply frame, including time-synchronization information for synchronizing a first internal clock time to a second internal clock time, in response to receiving the time-synchronization request frame; and a second node, having the second internal clock time and a second processor programmed to execute a process including receiving, from the first node, the message including the address of the first node, transmitting the time-synchronization request frame to the address of the first node after a specified transmission wait time has passed from a time when the message is received by the second node, receiving the time-synchronization reply frame including time-synchronization information transmitted from the first node which received the time-synchronization request frame, and performing time-synchronization, between the first internal clock time of the first node and the second internal clock time of the second node, using the time-synchronization information included in the time-synchronization reply frame.

* * * * *